US011151254B2

(12) United States Patent
Simmons et al.

(10) Patent No.: US 11,151,254 B2
(45) Date of Patent: Oct. 19, 2021

(54) SECURE COMMUNICATIONS GATEWAY FOR TRUSTED EXECUTION AND SECURE COMMUNICATIONS

(71) Applicant: AMARI.AI INCORPORATED, Littleton, CO (US)

(72) Inventors: Jonathan Alan Simmons, Littleton, CO (US); Eddie B. Satterly, Guffey, CO (US)

(73) Assignee: AMARI.AI INCORPORATED, Littleton, CO (US)

( * ) Notice: Subject to any disclaimer, the term of this patent is extended or adjusted under 35 U.S.C. 154(b) by 287 days.

(21) Appl. No.: 16/567,263

(22) Filed: Sep. 11, 2019

(65) Prior Publication Data
US 2020/0082117 A1 Mar. 12, 2020

Related U.S. Application Data

(60) Provisional application No. 62/729,835, filed on Sep. 11, 2018.

(51) Int. Cl.
*H04L 29/06* (2006.01)
*G06F 21/57* (2013.01)
(Continued)

(52) U.S. Cl.
CPC .......... *G06F 21/57* (2013.01); *G06F 21/53* (2013.01); *G06F 21/6245* (2013.01);
(Continued)

(58) Field of Classification Search
CPC ...... G06F 21/57; G06F 21/53; G06F 21/6245; H04L 9/3234; H04L 9/3247; H04L 63/102; H04L 63/105; H04L 2209/127
See application file for complete search history.

(56) References Cited

U.S. PATENT DOCUMENTS

| 6,345,361 B1 * | 2/2002 | Jerger ............... G06F 21/62 713/323 |
| 9,578,017 B2 | 2/2017 | Ferguson et al. |

(Continued)

FOREIGN PATENT DOCUMENTS

WO 2018153485 A1 8/2018

OTHER PUBLICATIONS

Zyskind et al. Decentralizing privacy: Using blockchain to protect personal data, Security and Privacy Workshops (SPW) 2015 IEEE, May 21, 2015, pp. 180-184 [online], [retrieved on Sep. 24, 2018], Retrieved from the Internet: <URL:http://homepage.divms.uiowa.edu/~ghosh/blockchain.pdf>.

(Continued)

*Primary Examiner* — Shin-Hon (Eric) Chen
(74) *Attorney, Agent, or Firm* — Holzer Patel Drennan

(57) ABSTRACT

A secure communications system that includes a trusted platform for securing user data and managing manifestation of user data to third parties in response to requests. The trusted platform may include a platform execution environment that coordinates with a trusted execution environment (TEE) for individual secure user profiles to manage requests for access. In some examples, partners may deploy partner programs to the TEE of a secure user profile for execution against secured user data in the secure user profile. All transactions in the trusted platform may be recorded in a ledger to provide an auditable history for all platform activity. All communication within the trusted platform may be by a secure communications protocol with a security gateway.

13 Claims, 18 Drawing Sheets

(51) Int. Cl.
*G06F 21/53* (2013.01)
*H04L 9/32* (2006.01)
*G06F 21/62* (2013.01)

(52) U.S. Cl.
CPC .......... *H04L 9/3234* (2013.01); *H04L 9/3247* (2013.01); *H04L 63/102* (2013.01); *H04L 63/105* (2013.01); *H04L 2209/127* (2013.01)

(56) References Cited

U.S. PATENT DOCUMENTS

| | | | |
|---|---|---|---|
| 9,608,825 B2 | 3/2017 | Sarangdhar et al. | |
| 9,635,021 B2 | 4/2017 | Smith | |
| 9,774,573 B2 | 9/2017 | Hitchcock et al. | |
| 9,798,895 B2 | 10/2017 | Nayshtur et al. | |
| 2003/0051171 A1* | 3/2003 | Pearson | G06Q 30/06 |
| | | | 726/4 |
| 2003/0055994 A1 | 3/2003 | Herrmann et al. | |
| 2004/0236745 A1 | 11/2004 | Keohane et al. | |
| 2006/0026418 A1* | 2/2006 | Bade | H04L 63/102 |
| | | | 713/150 |
| 2013/0198522 A1 | 8/2013 | Kohno et al. | |
| 2013/0227264 A1 | 8/2013 | Kim et al. | |
| 2014/0032920 A1 | 1/2014 | Gehrmann et al. | |
| 2014/0150116 A1 | 5/2014 | Edwards | |
| 2014/0208097 A1 | 7/2014 | Brandwine et al. | |
| 2016/0182502 A1* | 6/2016 | Smith | H04L 63/0884 |
| | | | 726/7 |
| 2017/0140375 A1 | 5/2017 | Kunstel | |
| 2017/0187748 A1 | 6/2017 | Durand et al. | |
| 2017/0230353 A1 | 8/2017 | Kurian et al. | |
| 2017/0317984 A1* | 11/2017 | Ollikainen | H04L 63/0421 |
| 2018/0018665 A1 | 1/2018 | Chene et al. | |
| 2018/0058923 A1* | 3/2018 | Lipson | G01J 1/0411 |
| 2018/0227275 A1 | 8/2018 | Russinovich et al. | |
| 2018/0239897 A1 | 8/2018 | Ventura | |
| 2018/0254898 A1 | 9/2018 | Sprague et al. | |
| 2018/0374097 A1* | 12/2018 | Hanna | H04L 67/306 |
| 2019/0140846 A1* | 5/2019 | Moore | H04L 9/3265 |
| 2020/0204556 A1* | 6/2020 | Smith | H04W 4/70 |

OTHER PUBLICATIONS

Azaria et al. Medrec: Using blockchain for medical data access and permission management, Open and Big Data (OBD), International Conference on, IEEE, Aug. 22, 2016, pp. 25-30, [retrieved on Sep. 24, 2018], Retrieved from the Internet: <URL:http://kddlab.zigsu.edu.cn:7200/research/blockchain/huyiyang-reference/MedRec%20Using%20Blockchain%20for%20Medical%20Data%20Access%20and%20Permission%20Management.pdf>.

Lind et al. Teechain: Scalable blockchain payments using trusted execution environments, Jul. 18, 2017 [retrieved on Sep. 10, 2019]. Retrieved from the Internet: <URL:https://www.doc.ic.ac.uk/~fkelbert/papers/teechainarxiv17.pdf>.

Brandenburger et al. Blockchain and Trusted Computing: Problems, Pitfalls, and a Solution for Hyperledger Fabric, May 22, 2018 [retrieved on Sep. 24, 2018]. Retrieved from the Internet: <URL:https://arxiv.org/pdf/1805.08541.pdf>.

Li et al. A survey on the security of blockchain systems, Future Generation Computer Systems, Aug. 20, 2017 [retrieved on Sep. 10, 2019]. Retrieved from the Internet: <URL:http://isiarticles.com/bundles/Article/pre/pdf/140929.pdf>.

PCT Search Report from corresponding PCT Application No. PCT/US2019/050566, dated Nov. 21, 2019.

PCT Written Opinion from corresponding PCT Application No. PCT/US2019/050566, dated Nov. 21, 2019.

Sandhu et al. 'Peer-to-Peer Access Control Architecture Using Trusted Computing Technology'. George Mason University. SACMAT '05, Jun. 1-3, 2005, Stockholm, Sweden [retrieved on Dec. 4, 2019], Retrieved from the Internet <URL: https://www.profsandhu.com/confrnc/sacmat/2005-tc.pdf> entire document.

* cited by examiner

SECURE COMMUNICATIONS GATEWAY FOR TRUSTED EXECUTION AND SECURE COMMUNICATIONS

CROSS-REFERENCE TO RELATED APPLICATIONS

The present application claims benefit of priority to U.S. Provisional Patent Application No. 62/729,835, entitled "SECURE IDENTITY GATEWAY" and filed on 11 Sep. 2018, which is specifically incorporated by reference herein for all that it discloses or teaches.

The present application is also related to U.S. patent application Ser. No. 16/567,251 entitled "DEPLOYMENT AND COMMUNICATIONS GATEWAY FOR DEPLOYMENT, TRUSTED EXECUTION, AND SECURE COMMUNICATIONS" filed Sep. 11, 2019, which is specifically incorporated by reference herein for all that it discloses or teaches.

BACKGROUND

Often times users share user data with service providers or other entities to, for example, receive desired services or information from the entity. Especially in the context of internet communications, providing third parties user data may present a potential avenue to compromise a user's security. Moreover, third parties may use user data received in a manner that is not according to the wishes of the user or in a manner in which the user is not aware.

The current approach to management of user data (e.g., including user identity data) relies on entities managing user data with little to no control by the user from whom the user data is received. In turn, if a user provides user data to a third party entity, the user may lose control over the user's data such that the user data may be managed or used in a manner contrary to the user's wishes.

Attempts to regulate the management, control, and/or use of user data have been proposed such as the General Data Privacy Regulation (GDPR) enacted by the European Union. While the GDPR may impose certain regulations on user data, the actual manner in which user data is controlled still relies on those receiving user data to manage the data in their possession. This presents potential complications for entities receiving user data and still does not provide positive control over a user's data. As such, continued solutions to enhance the management of user data is needed.

SUMMARY

The present disclosure relates to a secure commination system, and related methods, to selectively provide access to requested user data in a secure and auditable manner using a centralized trusted platform. Management of requests for access to user data include receiving, at a trusted platform, a request for access to user data stored in a secure user profile in a secure storage location accessible only by the trusted platform. The request identifies at least requested user data, a user identity for the requested user data, and a requesting entity. In turn, user defined access permission parameters applicable to the request are accessed, and the request is compared to the access permission parameters. In turn, the trusted platform determines whether access to the requested user data of the request is authorized by a user of the secure user profile based on the comparison of the request to the access permission parameters.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
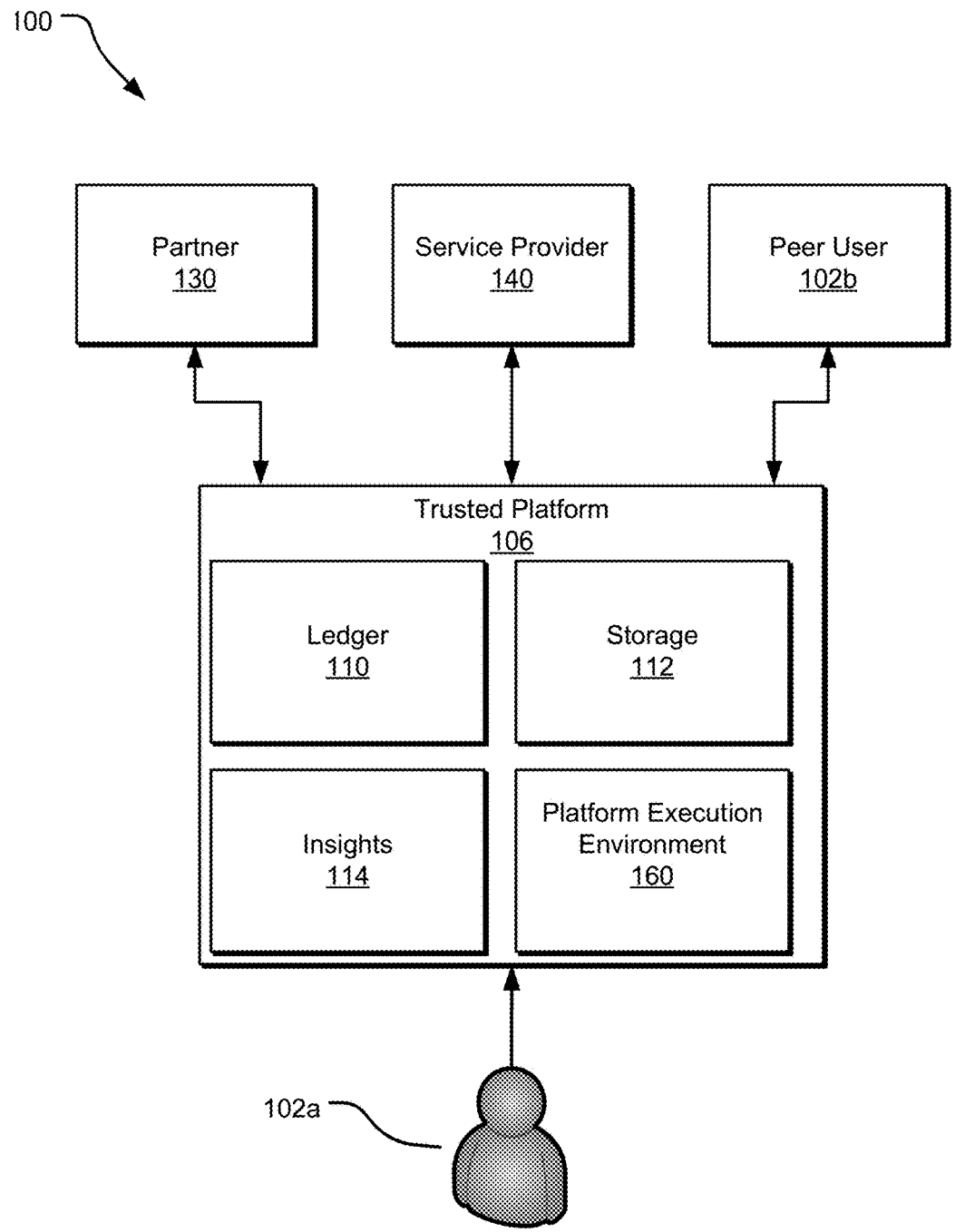
FIG. 1 illustrates an example of a secure communication system including a trusted platform.

FIG. 1 illustrates an example of a secure communication system 100. The secure communication system 100 includes a trusted platform 106 that may maintain, and control access to, user data of a user 102a of the secure communication system 100. Specifically, the user data may be stored in storage 112 of the trusted platform 106. A platform execution environment 160 may control access to the user data provided in the storage 112. In turn, one or more partners 130, one or more service providers 140, and/or one or more peer users 102b may request access to user data for the user 102a. The platform execution environment 160 may execute programs adapted for execution in the platform execution environment 160 to determine whether to, and/or to what extent to, manifest the user data to a requesting entity at least in part based on a request received to access the user data in view of one or more access permission parameters of the user 102a maintained at the trusted platform 106.

The trusted platform 106 may also have a ledger 110. The ledger 110 may provide an auditable record of all activity of the trusted platform. Accordingly, all requests, user data manifests, and other information may be recorded in the ledger 110 of the trusted platform 106. This may provide an auditable environment in which any and all requests or data transactions are recorded to provide heightened security to a user 102a.

As will also be described in greater detail below, the trusted platform 106 may include an insights module 114 that may be used to aggregate anonymized user data that may be used to determine aggregate user preference information across a number of users without compromising individual user data security. Participation, including what user data can be shared in the insights module 114, may be wholly controlled by the user 102a such that the user elections for participation in manifesting data to the insights module 114 is completely controlled by the user 102a. This may allow a user to make informed determinations that balance benefits in participation in the insights module 114 (e.g., potentially including tailored recommendations or experiences to the user 102a) with a user's desired security or privacy posture.

The secure communication system 100 may facilitate an improved environment that allows a user to control the manner in which user data is manifested to third parties that departs, at least in part, from the existing user data paradigm. For example, as described above, many current approaches to user data requires a user to provide user data to third parties with little or no control over the user data once provided. For example, when utilizing an application developed by a third party on a user device, a user may have limited control over the user data that the application has access to on the user's device. Moreover, once provided access to user data, the third party that collects the user data may copy, store, and otherwise use the user's data in a manner in which the user may or may not be aware. For example, while third parties may post terms regarding data use or user privacy, such terms may be subject to change and may not be evident when a user elects to share or grant data. Moreover, even if the user is aware of the manner in which their data is used, if the user later decides to no longer utilize the third party's application or no longer wishes for the third party to have the user's data, there may be little or no recourse on the part of the user to preclude continued use of the user's data or document a request to no longer use/store a user's data by the third party. In short, under current user data management paradigms, a user may have limited awareness of what parties have access to their data and may have little or no control over their data once provided to a third party.

In contrast, using the secure communication system 100, user data may be securely stored in secure storage 112 of the trusted platform 106. Rather than directly providing data to third parties, a user may direct all requests for user data to the trusted platform 106 that may be used to determine whether and/or to what extent to provide access to user data in storage 112 of the trusted platform 106. As may be appreciated in connection with the discussion below, this may allow a user to exercise far greater control over their user data.

In addition, all communication in the secure communication system 100 may be provided by secure means. For example and as will be described in greater detail below, any communication between an entity external to the trusted platform 106 and the trusted platform 106 may include accessing a security gateway to establish a secure communication connection with the trusted platform 106. The secure communications channels established in the secure communication system 100 may assist in reducing or eliminating the possibility of a malicious third party from surreptitiously accessing data when exchanged between authorized parties in the secure communication system 100. In turn, the trusted platform 106 may provide an audited secure communications profile for any interaction with or between components of the trusted platform 106. The trusted platform 106 may provide a secure identity gateway that provides a user 102a control over the manner in which user data for the user 102a is manifested to third parties or the trusted platform 106 itself.

Figure 2:
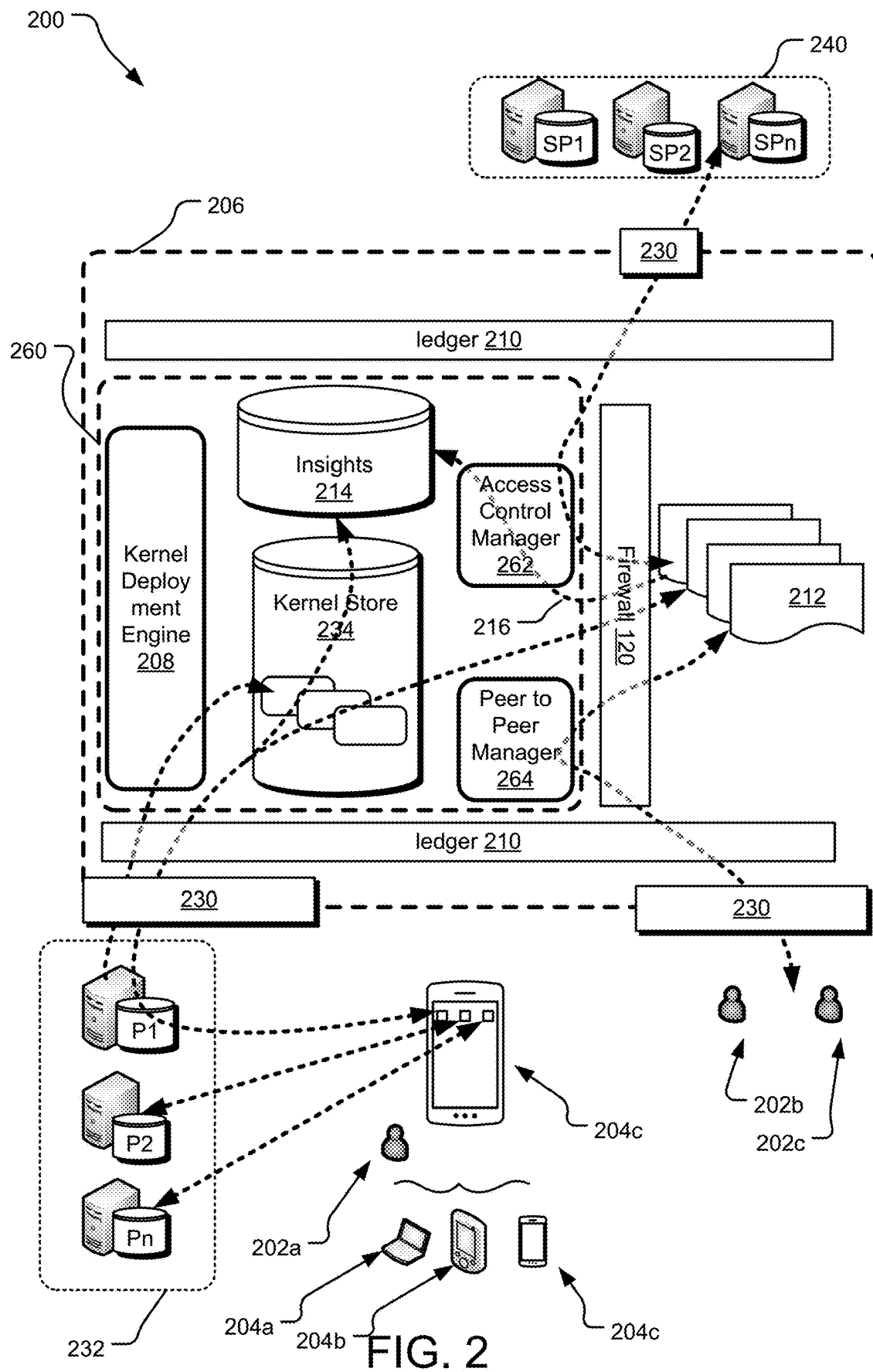
FIG. 2 illustrates an example of a trusted platform.

With further reference to FIG. 2, a more detailed schematic view of a trusted platform 206 is shown in the context of a secure communication system 200. A user 202a of the trusted platform 206 may utilize one or more user devices 204a, 204b, or 204c for use in accessing the trusted platform 206. As described in greater detail below, the each user device 204a, 204b, 204c may have deployed thereon appropriate software or other program to facilitate interaction with the trusted platform 206 that may allow a user 202a to interact with the trusted platform 206.

The trusted platform 206 may be accessed by a number of users 202a, 202b, and 202c. Each user 202a, 202b, and 202c may have a unique secure user profile 212 stored in the trusted platform 206. Each unique secure user profile 212 may be isolated in secure storage such that only the respective user 202 corresponding to a secure user profile 212 may have permission to manifest access and/or manage the secure user profile 212. For example and as discussed in greater detail below, each user secure user profile 212 may comprise a trusted execution environment (TEE) and/or secure storage. In this regard, a firewall 120 is shown in FIG. 2 to illustrate that each secure user profile 212 may be securely isolated within the trusted platform 206 to provide a unique secure execution and storage space for each user 202 of the trusted platform 206. While the firewall 120 illustrates secure isolation of the secure user profiles 212 from the other components of the trusted platform 206, it may also be appreciated that each secure user profile 212 may also be securely isolated from other secure user profiles 212. Each secure user profile 212 may have appropriate security provisions to preclude access to the secure user profile 212 by others than those authorized by a corresponding user 202 for the secure user profile 212.

The secure communication system 200 may be in communication with one or more service providers 240 and/or one or more partners 232. As will be described in greater detail below, any of a service provider 240, partner 242, or peer user 202b, 202c may request access to requested user data of a secure user profile 212 of the trusted platform 206. Access to the requested user data of the secure user profile 212 may be controlled based on access permission parameters such that only access permitted by a user 202 for the secure user profile 212 may authorize such access.

A user may have control over various manners in which user data is manifested to third parties. For example, a user may elect to grant user data with a third party. When sharing user data, the requested user data may be retrieved from the secure user profile 212 and communicated to the requesting third party. When providing user data to a third party in connection with a share or grant of user data, the trusted platform 206 may include in the communication an indication of a permitted use of the shared or granted user data. In this regard, while a share of user data may manifest the user data outside of the trusted platform 206, the user data provided may at least be limited in the permitted use of the user data, which may recorded in the ledger 210 when providing the user data to the third party. Alternatively, a user may provide a share of access to third parties. This may allow the third party to execute against the requested user data in the secure user profile 212. In this regard, the requested user data may remain only in the secure user profile 212, and the requestor may be provided access to the requested user data in the secure user profile 212 according to access permission parameters. In the case of share of access to requested user data, all data may remain only stored in the secure user profile 212. In either the case of a share or a grant, a user may later revoke the permission previously provided. In the case of a share, such a revocation may be effectuated in the trusted platform 206 by disallowing any access to the user data by the third party whose share of access has been revoked. Such a revocation may be recorded in the ledger 210. In the case of a grant, upon revocation, a message may be provided to the third party to no longer user and return and/or destroy the user data provided in a prior grant. Alternatively, a revocation message may be provided that imposes greater limits on the permitted use of the data. Either type of revocation message may be recorded in the ledger 210. Either a grant or a share can be provided to any level of data per metadata tags, entire profiles, or specific data needed by the partner to complete a required action. For example if a restaurant app needs your preferred food and price preferences to provide recommendations the user can share just that information with that service provider or partner. Further discussion regarding use of metadata tags for data at different respective security levels is described in greater detail below.

In order to facilitate control over the secure user profiles 212, the trusted platform 206 may include a number of control programs that execute to securely manage access to the secure user profiles 212. In this regard, the trusted platform 206 may include a platform execution environment 260 in which a number of trusted platform components may be executed. The platform execution environment 260 facilitate execution of an access control manager 262 for processing requests received for access to user data from service providers 240. A peer to peer manager 264 may execute in the platform execution environment 260 for processing requests received for user data from peer users 202b and 202c. More detailed operation of the access control manager 262 and the peer to peer manager 264 are described in greater detail below. In one example, the access control manager 262 and the peer to peer manager 264 may be available as signed programs in a kernel store 234 that are optionally executed and/or controlled by a user 202a for controlling access to a corresponding secure user profile 212 for the user 202a. Preferences are pushed down from the access control manager 262 to user devices 204a, 204b, 204c as a component of the kernel, deployed from the kernel store 234. For instance, a mini-kernel corresponding to the access control manager 262 may also be deployed to one or more of the user's devices 204a, 204b, and 204c that may receive preferences from the access control manager 262 of the trusted platform 206. These preferences allow the mini-kernel on the user's device 204a, 204b, 204c to execute without connection back to the trusted platform 106 (e.g., while in offline mode or to conserve use of bandwidth). The preferences will be automatically updated when the device is connected back to the trusted platform 106 or as needed (e.g., to obtain preferences related to a new request that requires user intervention to establish the preferences).

In an example, the programs executing in the platform execution environment or a TEE of a secure user profile 212 may be a kernel program or "kernel." In this regard, the kernels may comprise low level abstraction layers executed in the respective execution environments, thus allowing for secure execution in the platform execution environment 260 or the secure user profile 212 (e.g., a TEE thereof).

The kernel store 234 may also include one or more partner programs (not shown in FIG. 2). A partner 232 may develop a program for execution in an execution environment of the trusted platform 206. Specifically, the partner 232 may submit the partner program to a kernel deployment engine 208, which may test and certify the partner program prior to deploying the partner program into the kernel store 234. This process is described in greater detail below in FIGS. 12-18. In any regard, a partner program may be provided from the kernel store 234 for execution in an execution environment of the trusted platform 206 in a manner that is certified through testing and documented through audited secure communication.

Communication between components of the trusted platform 206 and also between third parties and the trusted platform 206 may be by way of a secure communication protocol. For example, a proprietary secure communication protocol may include one or more of a virtual private network or encrypted communication channels. In turn, each user 202 may communicate securely with the trusted platform 206 by way of a secure gateway 230. Moreover, all communication between partners 232 and the trusted platform 206 may also be by way of a secure gateway 230. Further still, all communication between a service provider 240 and the trusted platform 206 may be way of a secure gateway. The secure gateways 230 may require an authenticated secure communication protocol. This may reduce or eliminate the potential for side channel taking of user data when communicated outside the trusted platform 206. That is, the use of the secure gateways 230 for communication with the trusted platform 206 may extend the data security of the user data when such user data is communicated to a peer user 202b, 202c, a partner 232, or a service provider 240 that is authenticated using the secure communication protocol for communication via the secure gateway 230. For example, the secure gateway 230 may employ an IPSec protocol suite for authenticated and encrypted communication with and between components of the trusted platform 206. In another example, the user device 204a, 204b, 204c may employ encrypted communication over several protocols such as https, to communicate with all components of the trusted platform 206. Moreover, different respective secure communication protocols may be used between different components of the trusted platform 206 without limitation. For example, communication with a partner 232 through a secure gateway 230 may be by way of an IPSec protocol, whereas communication between a user's device 204a, 204b, 204c and the user's secure user profile 212 may employ strict certificate TLS authentication to facilitate communication.

The trusted platform 206 also includes a ledger 210 that may used to record transactions within the trusted platform 206. For example, each request for access to user data may be recorded in the ledger 210. Moreover, any manifesting of user data or denials for manifesting user data may be recorded in the ledger 210. Further still, the ledger 210 may be used to record access permission parameters that a user may apply to data at varying levels of granularity and detail as described below. In this regard, the ledger 210 may be used to provide an auditable record for every transaction processed by the trusted platform 206. The ledger 210 may be secured by any appropriate means to reduce or eliminate inappropriate tampering with the ledger 210. As an example, the ledger 210 may employ a blockchain-based distributed ledger that secures the recorded transactions within the ledger 210 using blockchain techniques. In this regard, and as described in greater detail below, the secure platform 206 may comprise a distributed, cloud computing architecture. As such, each instance of the trusted platform 206 may have an instance of the ledger 210. Also, the ledger 210 may be replicated or distributed amongst a number of nodes such as at a user device 204, within a secure user profile 212, or at another node. Distribution of the leger 210 may facilitate fault tolerance (e.g., using security advantages associated with distributed ledger technologies within blockchain). In another example, the trusted platform 206 can also use external ledger technologies such as financial services ledgers to store transactions, such as any monetization by users of their data, at their discretion.

The trusted platform 206, which may be a distributed system may, in at least one example, be executed in a cloud computing environment. Specifically, individually provisioned cloud containers may be attributed to various components of the trusted platform 206. As an example, each secure user profile 212 may comprise a unique container executed in a cloud computing environment. Furthermore, the secure storage of a secure user profile 212 may comprise dedicated secure storage (e.g., object storage) that is unique for each secure user profile 212. Such partitioning of the secure user profile 212 may facilitate improved security and management of such storage by a user 202a. Moreover, the platform execution environment 260 may comprise one or more cloud computing components to facilitate execution of the trusted platform 206. Moreover, to the extent that components of the trusted platform 206 may be distributed in various cloud computing environments or components, any communication between components of the trusted platform 206 may utilize a secure communications protocol, including security gateways 230, as described above even through such security gateways 230 are not depicted in FIG. 2 between components within the trusted platform 206. In this regard, it may be appreciated that any execution environment or storage may be scalable by adding or removing cloud resources.

The distributed trusted platform 206 may include multiple instances of the trusted platform 206 or multiple instances of components of the trusted platform 206. The multiple instances of the trusted platform 206 or components thereof may coordinate to service users or may be isolated to provide private trusted platform instances 206 for a limited user group (e.g., an organization or other secure, private group). In this regard, groups of users 202 served by one or more instances of the trusted platform 206 may be referred to as a realm. Accordingly, multiple private and/or public realms may be defined. For example, trusted platform parameters within a given realm may be varied for a particular purposes (e.g., security protocols or the like).

The trusted platform 260 also includes an insight module 214. The insights module 214 may comprise anonymized user insights data based on user data from a plurality of secure user profiles 212. Specifically, users 202 may configure anonymized user data is used with the insights module 214. As will be described in greater detail below, user data may be provided at a number of different granularities or layers such that different user data may have different access permission parameters or allowances applied thereto. As such, a user 202 may define what user data to share with the insights module 214. Moreover, as all insights data may be managed within the trusted platform 206, upon a user electing to no longer provide access to user data for execution in the insights module 214, such an election may be enforced within the trusted platform 206 to conform to the user's defined data permission parameters (e.g., all or selected user data may be withdrawn from the anonymized data set or additional user data may be shared with the insights module 214).

Upon a user 202 opting into providing user data to the insights module 214, the access control manager 262 may facilitate access to the appropriate user profiles 212 using appropriate secure communications protocols. In addition, an anonymization protocol 216 may be applied to the user data to create a unique anonymized user insights data set based on the user data shared with the insights module 214. The anonymized insights data set may be stored at the insights module 214. That is, the insights data set may include a unique, separate data set comprising the anonymized data from the user profiles 212 as granted by corresponding users 202. In turn, partners 232 may access the insights module 214, and in particular the insights data set to provide analysis of the insights data. In particular, partners 232 may develop and deploy an insights kernel (e.g., through the kernel deployment engine 208) that may access the insights module 214. In this regard, partners 232 may access the insights data to perform insights analysis regarding user preferences associated with user demographic data or the like. Such insights analysis may be used to fine tune user experiences in partner programs deployed in the system or other partner offerings (e.g., real world advertising campaigns and the like).

Figure 3:
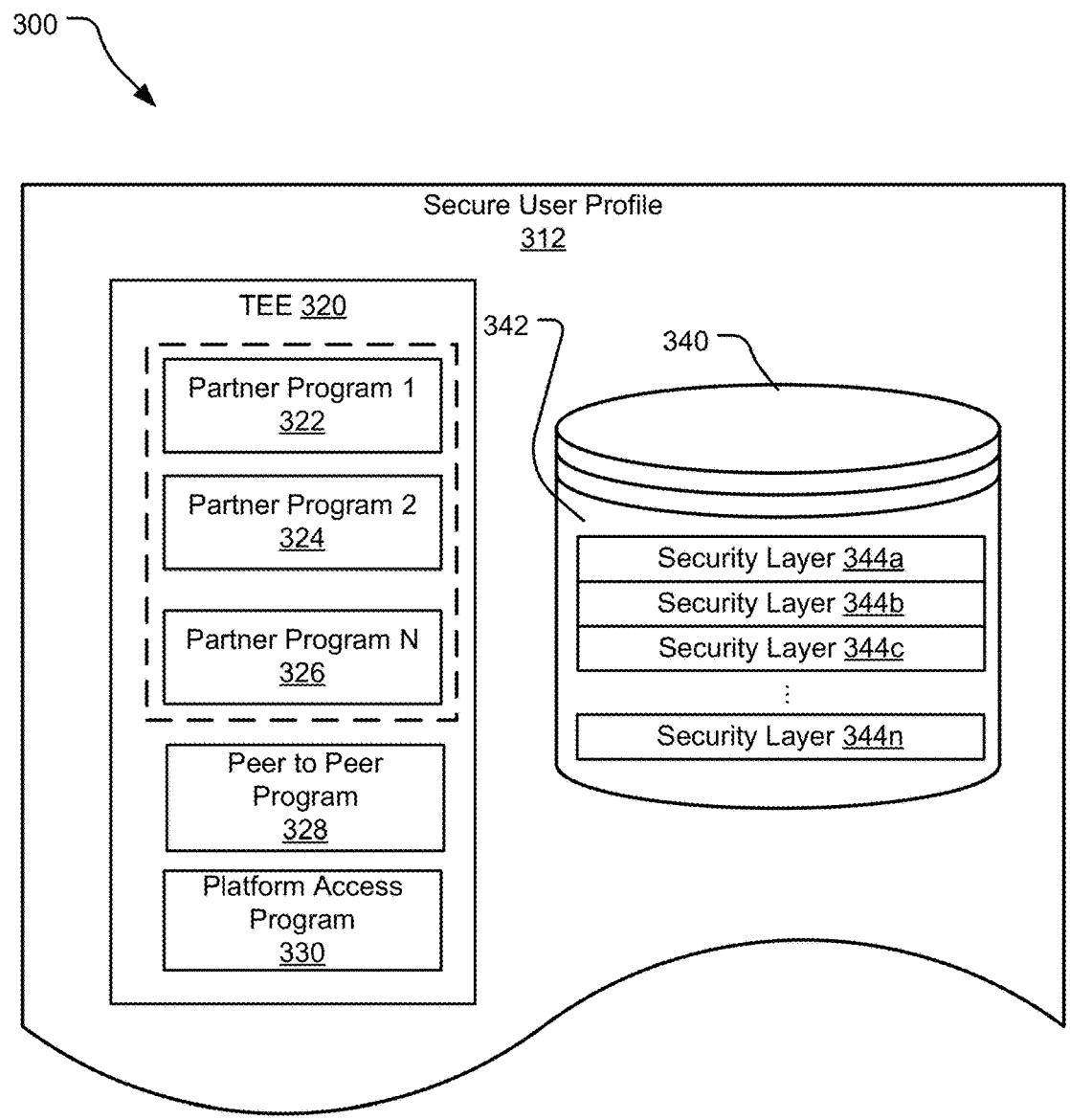
FIG. 3 illustrates an example of a secure user profile including secure storage and a trusted execution environment.

With further reference to FIG. 3, one example of a secure user profile 312 is illustrated schematically. The secure user profile 312 may include a TEE 320 and secure storage 340. As described above, the TEE 320 of the secure user profile 312 may be an execution environment deployed in a cloud computing environment. Specifically, each secure user profile 312 may have a uniquely provisioned TEE 320. In any regard, the TEE 320 may include one or more programs (e.g., kernels) deployed to the secure user profile 312 from a kernel store 234 of the trusted computing platform 206. In this regard, the TEE 320 may include N partner programs including in the example depicted in FIG. 3 partner program 1 322, partner program 2 324, and partner program N 326, with N being any appropriate number of partner programs deployed to the secure user profile 312 from the kernel store 234. Accordingly, the partner programs 322, 324, and 326 may comprise tested and certified programs or kernels that may be deployed into the TEE 320 for execution at the direction of the user to access user data in the secure storage 340. Deployment of partner programs 324 to the TEE 320 may be controlled by the user.

The TEE 320 may also include a peer to peer program 328 corresponding to the peer to peer manager 264 that may interact with a peer to peer manager executing in the platform execution environment 260 described above in relation to FIG. 2. The TEE 320 may also include an access control program 330 that may interact with an access control manager executing in the platform execution environment described above in relation to FIG. 2.

A program in the TEE 320 (e.g., the peer to peer program 328 or the access control program 330) may comprise related kernels to a program executing in the platform execution environment 260. When a program is deployed to the TEE 320 of the secure user profile 312, access permission parameters may be loaded into the programs at the TEE 320 to allow the programs to handle requests for access to user data at the TEE 320 without having to communicate with the platform execution environment 260. In addition, further programs (e.g., mini-kernels) may also be deployed to a user device 204, which may allow processing of a request to user data to occur at the user device 204 (e.g., to facilitate offline processing or the like). If any one of the programs cannot process a request (e.g., due to missing access permission parameters needed to process the request or the like), the program may communicate upstream (i.e., in a network direction towards the platform execution environment 260) to process a request. For instance, a mini-kernel on a device 204 may communicate with either a corresponding program in the TEE 320 of the secure user profile 312 or a corresponding program in the platform execution environment 260 to process a request. As an example, if a user has not previously authorized or denied access as requested, a program of the TEE 320 may communicate to a corresponding program in the platform execution environment 260 to provide a notice to a user to provide appropriate access permission parameters for the request. Once established, such access permission parameters may be pushed to the program in the TEE 320 or to a program on a user device 204 to facilitate processing of like requests in the future. Moreover, access permission parameters may be different for different devices 204 or for different programs in the TEE 320. For example, a user may have a work device 204b and a personal device 204c. The user may establish different programs and/or access permission parameters for each device such that request for data processed by each device may be handled differently to provide different access levels when using the respective devices. At each subsequent level away from the platform execution environment 260, each program instance deployed may be a more limited version of the program, thus offering fewer features or less robust processing. While this may allow for processing of some requests in a more efficient manner, it may still be useful to propagate a request to the TEE 320 or platform execution environment 260 to employ the expanded capability of the programs at these instances.

The secure storage 340 of the secure user profile 312 may include a multi-layered data structure 342 comprising a plurality of security layers 344a-344n. The security layers 344a-344n may correspond to different respective access permission parameters for each layer that may, at least in part, be used to determine whether a request for access to user data of a given security layer 344. For example, respective portions of user data may be allocated to a given security layer 344 and assigned appropriate access permission parameters. As an example, user data related to a user's finance may be allocated to security layer 344a. Security layer 344a may be assigned access permission parameters that limits access to this data to specific partners, service providers, or other peer users for certain uses. Furthermore, a user's health data may be allocated to security layer 344b. Security layer 344b may be assigned access permission parameters that limits access to this data to specific partners, service providers, or other peer users for certain uses. In this example, a user may wish to share first data from a first security layer in a first manner and second data from a second security layer in a second manner. Data may be provided at more than one security layer and/or different granularity of data may be provided at each layer. For example, user health data regarding the identity of a user's health providers may be provided a security layer 344c. In contrast, user health data regarding user health information comprising protected health information such as test results, chart notes, etc., may be provided at security layer 344b. A user may share the health data in layer 344c differently than the data in security layer 344b. In any regard, a user may allocate and/or assign any data at any granularity to any respective security layer 344. Moreover, access permission parameters may be assigned to each respective security layer 344. In this regard, a user may have controlled configuration of the access to the user data stored in the secure storage 340.

In this regard, requests for user data may be processed by one or more programs in the TEE 320 of the secure user profile 312 and/or a platform execution environment to determine whether the request for access to the user data can be granted. While requests from different entities may be processed differently as described in greater detail below, each request may at least identify requested user data, a user identify for the requested user data, and a requesting entity. These request parameters may be received at the trusted computing platform 206. Access permission parameters corresponding to the request parameters may be retrieved to determine whether the request for access to the requested data is accessible in view of the access permission parameters. In this regard, all requests for user data may be processed by the trusted platform 206 to allow a user control over who gains access to what user data for what purpose for the user as will be appreciated in greater detail with the following discussion regarding specific requests received from a service provider, a partner, and a peer user, respectively.

Figure 4:
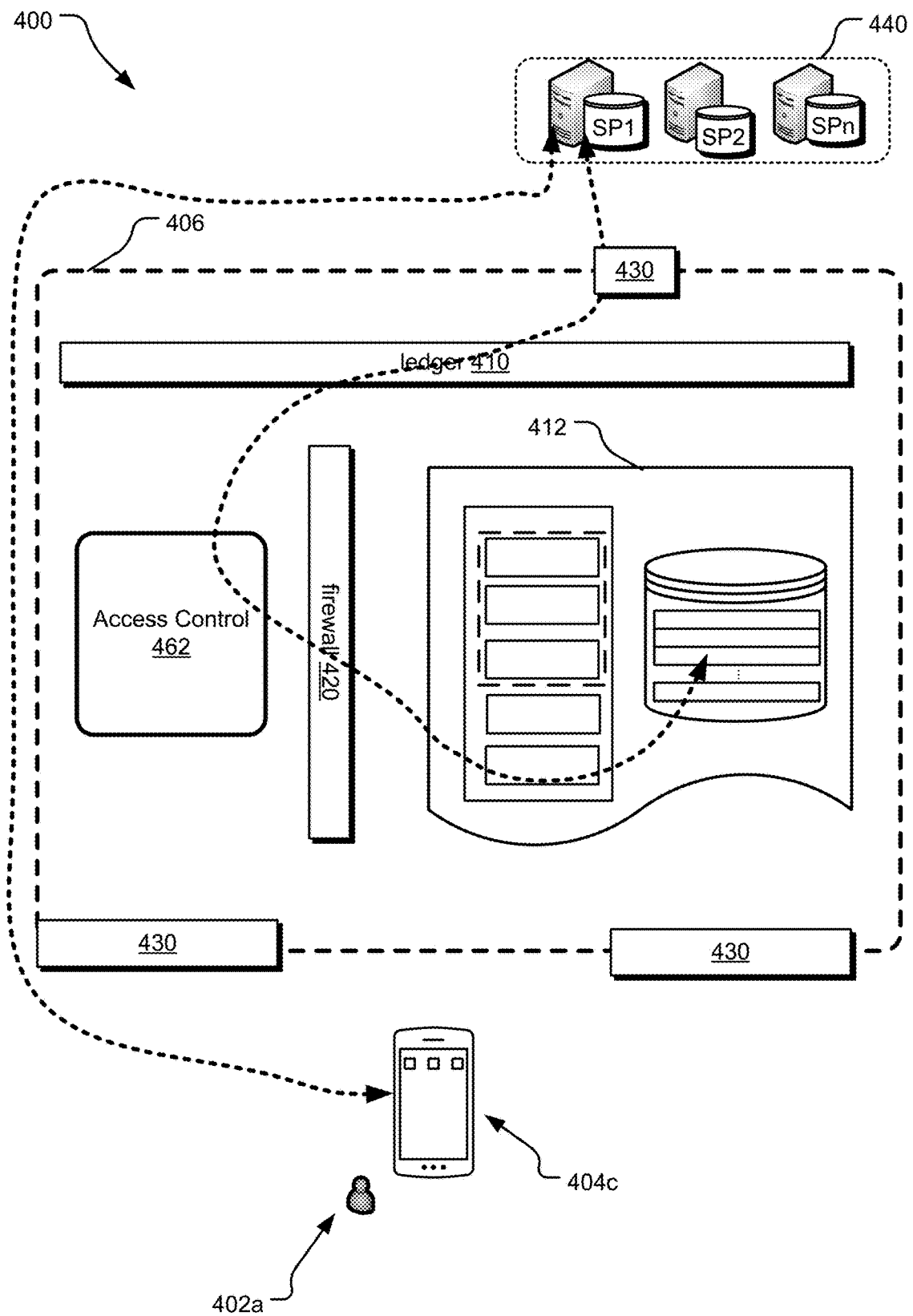
FIG. 4 illustrates an example of components of a trusted platform involved in processing a request for access to user data from a service provider.

FIG. 4 illustrates an example of a trusted platform 406 shown only with participating components in the processing of requests from service providers 440 for purposes of clarity. A user 402a may use a user device 404c to connect to a service provider 440. For example, a user 402a may navigate to a service provider website or may execute a service provider application on the user device 404c. In any regard, communication between the user device 404c and the service provider 440 may be established. The service provider 440 may seek user data for any of a number of purposed including, for example, the purpose of providing a service to the user 402a such as provision of data in response to the user data, customization of information presented to the user 402a, or for any other of a plurality of potential reasons that the service provider 440 seeks the user data. In response, a user 402a may direct the service provider to the trusted platform 406 to request the requested user data from the secure user profile 412 for the user 402a (e.g., rather than providing the user data directly).

In turn, the service provider 440 may establish communication with the trusted platform 406 by way of a security gateway 430. Specifically, a request from the service provider 440 may be provided to an access control module 462. In addition, the request may be recorded in a ledger 410. The access control program 462 may identify from the request the requested user data, a user identity of the user for the requested user data, and a requesting entity (e.g., the service provider 440). Based on one or more of these request parameters, the access control module 462 may retrieve the appropriate access permission parameters and determine, based on a comparison of the request and the access permission parameters, whether to grant access to the request to access the requested user data. For example, the requested data may be identified in a security layer 344 of the multi-layered data structure 342. The access permission parameters for the requested data based on the security layer to which the requested data belongs may be compared to the request. If the access permission parameters indicate the user has provided access in the nature of that requested, the requested data may be retrieved from the secure user identity 412 by securely accessing the secure user identity 412 through the firewall 420. The requested data may then be provided to the service provider 440 in response to the request. The provision of the requested data to the service provider 440 may be recorded in the ledger 410.

Figure 5:
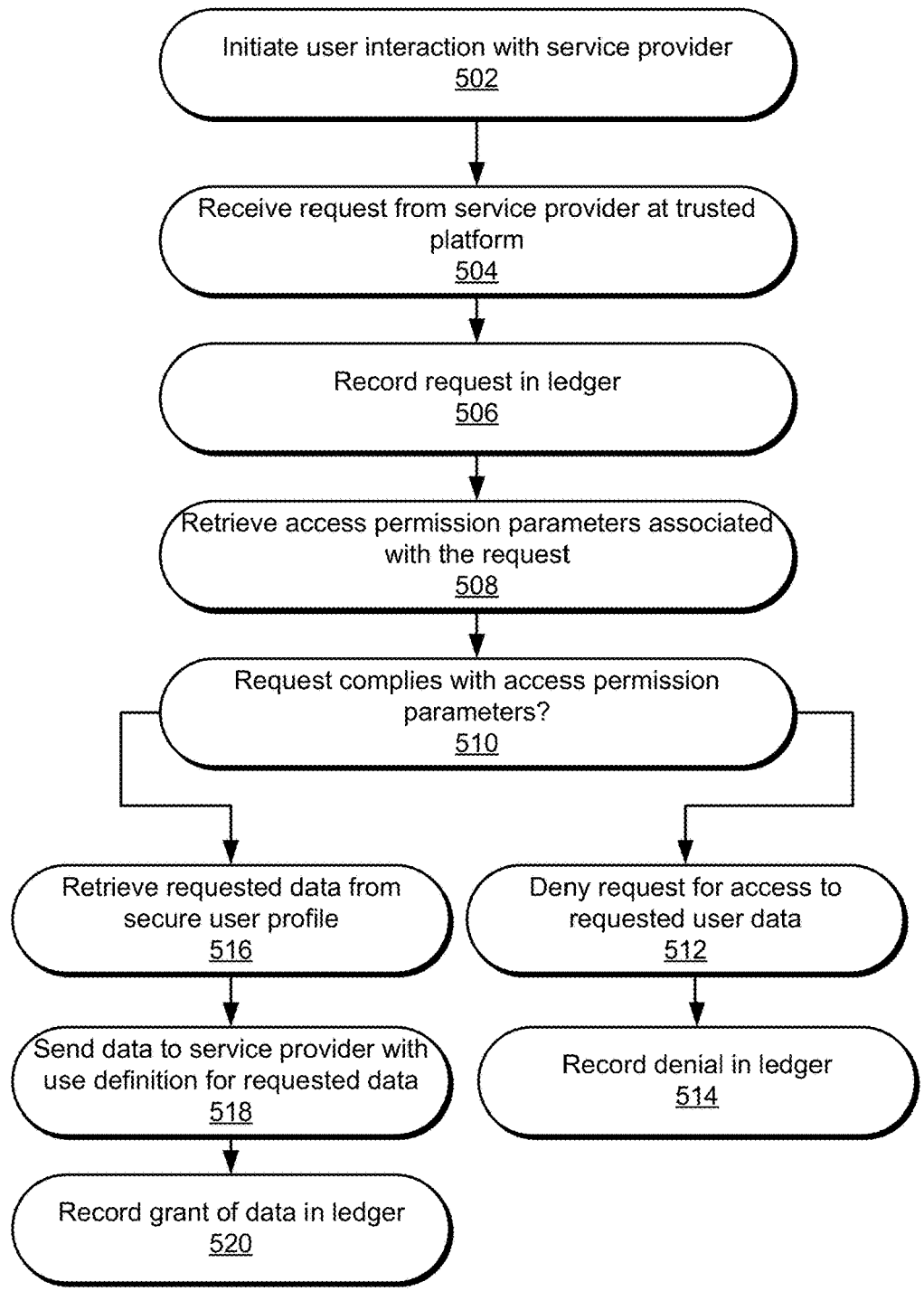
FIG. 5 illustrates example operations for processing a request for access to user data from a service provider.

With further reference to FIG. 5, example operations 500 for processing a request from a service provider are illustrated. The operations 500 may commence with an initiating operation 502 in which a user initiates interaction with a service provider. As may be appreciated from the foregoing description, the initiating operation 502 may include the service provider requesting user data from the user (e.g., in connection with provision of a service or the like). In turn, a receiving operation 502 includes receiving a request from the service provider at the trusted platform. A recording operation 506 records the request from the service provider in a ledger.

In turn, the access permission parameters for the requested data may be retrieved. A retrieving operation 508 retrieves access permission parameters associated with the request. For example, the requested user data may be identified from the request. Such requested user data may be located in a multi-layered data structure. The user identity secure storage having a plurality of security layers allows for data to be grouped and metadata tagged based on type, sensitivity, or any other user-definable parameters. For example, a user may apportion user data to a given security layer at any granularity of the data. This may allow a user to control the user data to whatever extent the user wishes by attributing access permission parameters to any number of security layers into which data has been apportioned. As such, the identification of the data may include use of metadata tags for the data. For example, metadata tags may be attributed to user data that define association of the user data to a security layer or to an access permission parameters. In turn, metadata tags for the requested data from the request may be identified and corresponding metadata tags may be used to identify the requested data in a secure user profile such that access permission may be analyzed in relation to the request (e.g., including the request parameters included in the request such as the requesting party, the nature of the requested data, the indicated use of the user data, etc.) in a determining operation 510 in which it is determined whether the request corresponds to allowed access to the user data based on the access permission parameters.

If the determining operation 510 determines that the request is not allowed in view of the access permission parameters, a denying operation 512 may refuse the request for access to the requested user data. In addition, the refusal may be recorded in an recording operation 514 in which the refusal is documented in a ledger. In contrast, if the request is allowable in view of the relevant access permission parameters for the request, a retrieving operation 516 may retrieve the requested user data from the secure user profile. A sending operation 518 may include sending the requested user data that is retrieved from the secure user profile to the service provider requesting the user data. Of note, the service provider may be provided with only the requested data from the request such that other user data from the secure user profile not requested is not provided or otherwise accessible by the service provider. In addition, the sending operation 518 may include providing a limitation on the use of the requested data. The limitation on the use of the requested data may be the same as an indicated use from a request. Alternatively, if a request has no such indicated use, the sending operation 518 may include generating a permissible use of the user data that is communicated with the requested data in the sending operation 518. In addition, the grant of access may be recorded in a ledger in a recording operation 520. This recording may include recording any limitation on use of the data provided in the sending operation 518. As such, an auditable record may be established if the service provider were to utilize the requested user data in a manner not authorized by the limitation on use of the requested user data.

Figure 6:
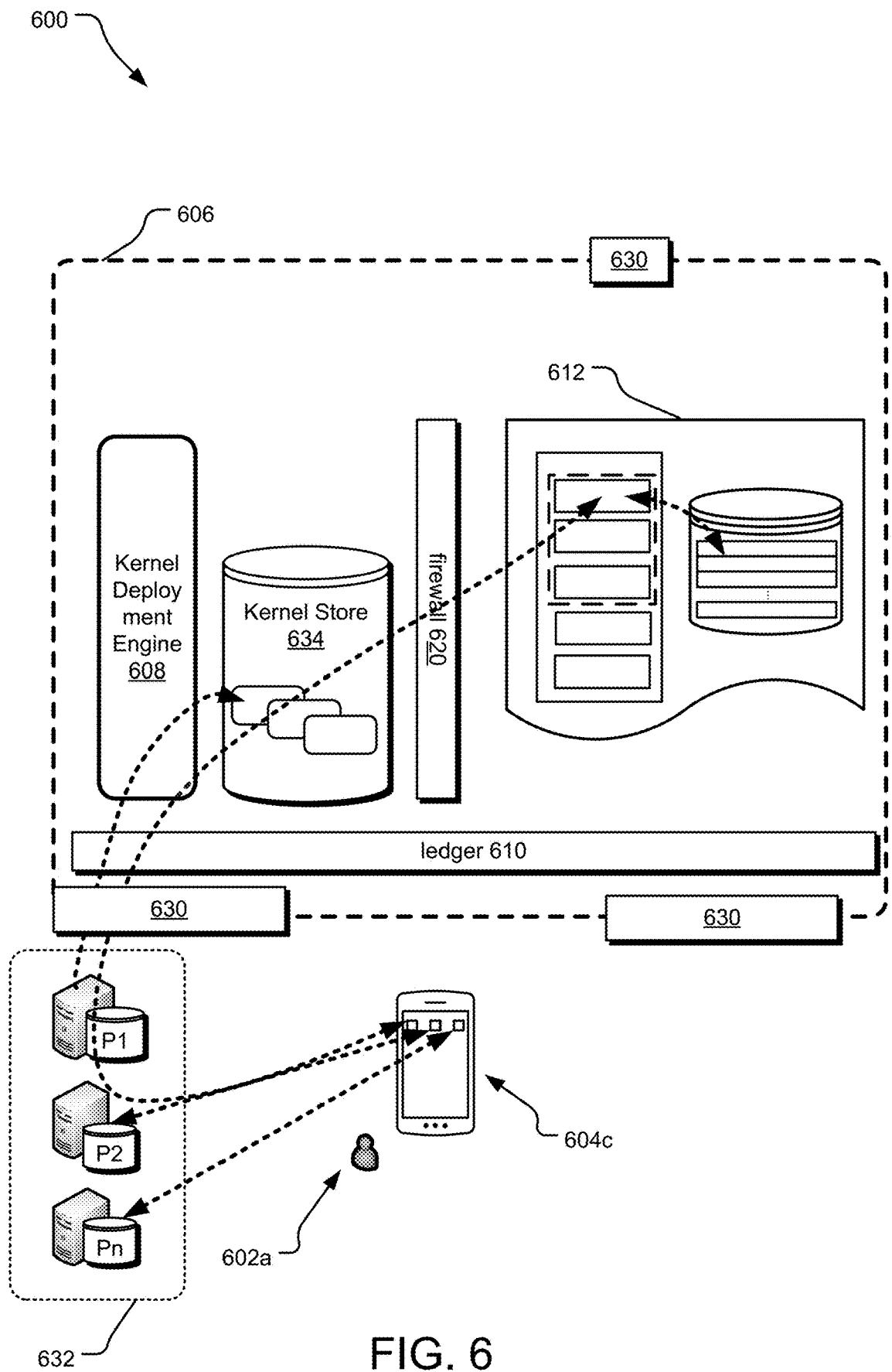
FIG. 6 illustrates an example of components of a trusted platform involved in processing a request for access to user data from a partner entity to the trusted platform.

FIG. 6 illustrates an example of a trusted platform 606 shown only with participating components in the processing of requests from partners 632 for purposes of clarity. As briefly described above, partners 632 in the trusted platform 606 may provide programs for execution in the trusted platform 606. As such, partners 632 may provide programs to the kernel deployment engine 608, which may test and certify the program to ensure the program performs in the manner described by the partner to ensure that any user data accessed by the program is treated in a manner that is expected without data siphoning, surreptitious data sharing, or other disposition of user data that a user may not be aware of otherwise. Once tested and certified, the partner program may be provided in a kernel store 634. A user 602*a* may then access the trusted platform 606 and choose to deploy the partner program into the user's secure user profile 612. That is, the partner program may be executed in a TEE of the secure user profile 612 behind a firewall 620. In turn, when the partner program executes in a manner that requires access to user data, the request may be issued from the TEE of the secure user profile for access to requested user data in the secure storage of the secure user profile. As described above in relation to service provider requests, a request from a partner program executing in the TEE of the secure user profile may be processed in the secure user profile 612 to determine whether requested user data is authorized to share with the partner program. If, based on comparison of the request from the partner program to appropriate access permission parameters corresponding to the request, access is granted, the partner program may access the requested user data from the secure storage for use in execution of the partner program in the TEE of the secure user profile 612.

In contrast to the service provider request described above, because a partner program executes in a secure user profile 612, the user data need not be provided outside the secure user profile 612 for the partner program to utilize the user data. That is, the user data may not be provided to the partner 632, but rather used in the execution of the partner program in the TEE of the secure user profile 612. Any data communicated to the partner 632 may be according to disclosed data usage that has been tested and certified by the kernel deployment engine 608. Moreover, if the user 602*a* elects to revoke access to user data by the partner program, the partner program may be deleted from the TEE of the secure user profile 612 such that the partner 632 no longer has access to the user data. In this regard, the partner program allows a user to further control access to user data as user data need not be communicated to the partner 632 as the partner program may be executed in the TEE of the secure profile 612 with access to user data as defined by the access permission parameters without requiring the user data to be communicated remotely to the partner 632.

Figure 7:
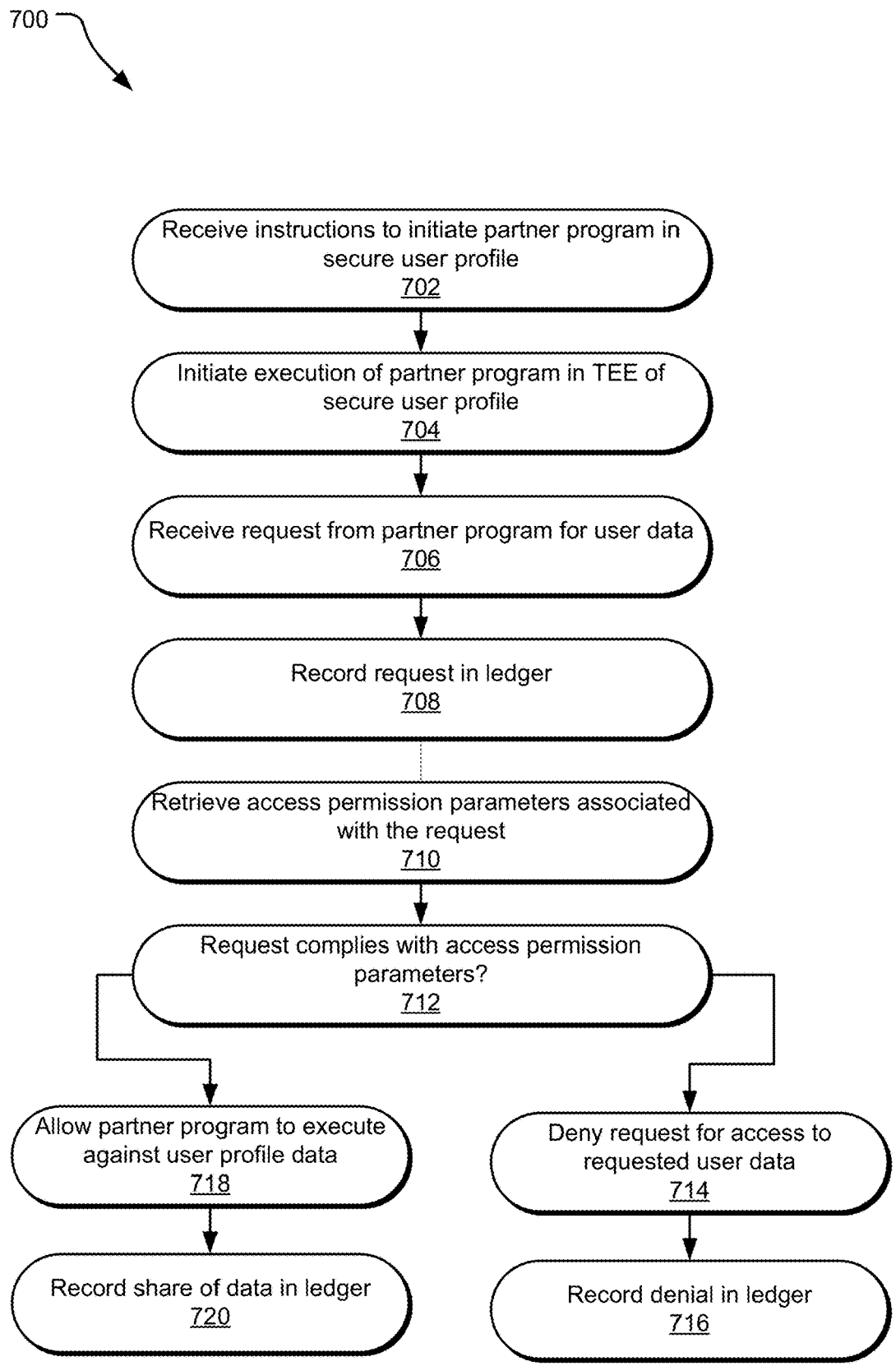
FIG. 7 illustrates example operations for processing a request for access to user data from a partner entity to a trusted platform.

With further reference to FIG. 7, example operations 700 for processing a request from a partner are illustrated. The operations 700 may include a receiving operation 702 in which instructions are received to initiate execution of a partner program in a TEE of a user's secure user profile. This may include deploying the partner program from a kernel store of the trusted platform. Furthermore, a related partner program may also be deployed to a user device. The related partner program may be provided within an environment for interaction with the trusted platform such as an application launchpad within an application for the trusted environment. An initiating operation 704 may initiate execution of the partner program in the secure user profile (e.g., in the TEE of the secure user profile).

A receiving operation 706 may receive a request to access secure storage from the partner program. The request may include request parameters including the requesting entity (e.g., which may be automatically established as the partner associated with the partner program), the requested user data, an intended use of the data, etc. A recording operation 708 may record the request in a ledger.

A retrieving operation 710 may retrieve access permission parameters associated with the request. In turn, the request may be analyzed in view of the access permission parameters in a determining operation 708 to determine if the request complies with the access permission parameters. If the request does not comply with the access permission parameters, the request may be denied in a denying operation 714 and the denial of the request may be recorded in the ledger in the recording operation 716. If, in contrast, the request is approved in view of the access permission parameters, an allowing operation 718 may allow the partner program executing in the secure user profile access to the requested user data. In this instance, a recording operation 720 records the grant of the access to the requested user data and may also record what data is access or used by the partner program.

Figure 8:
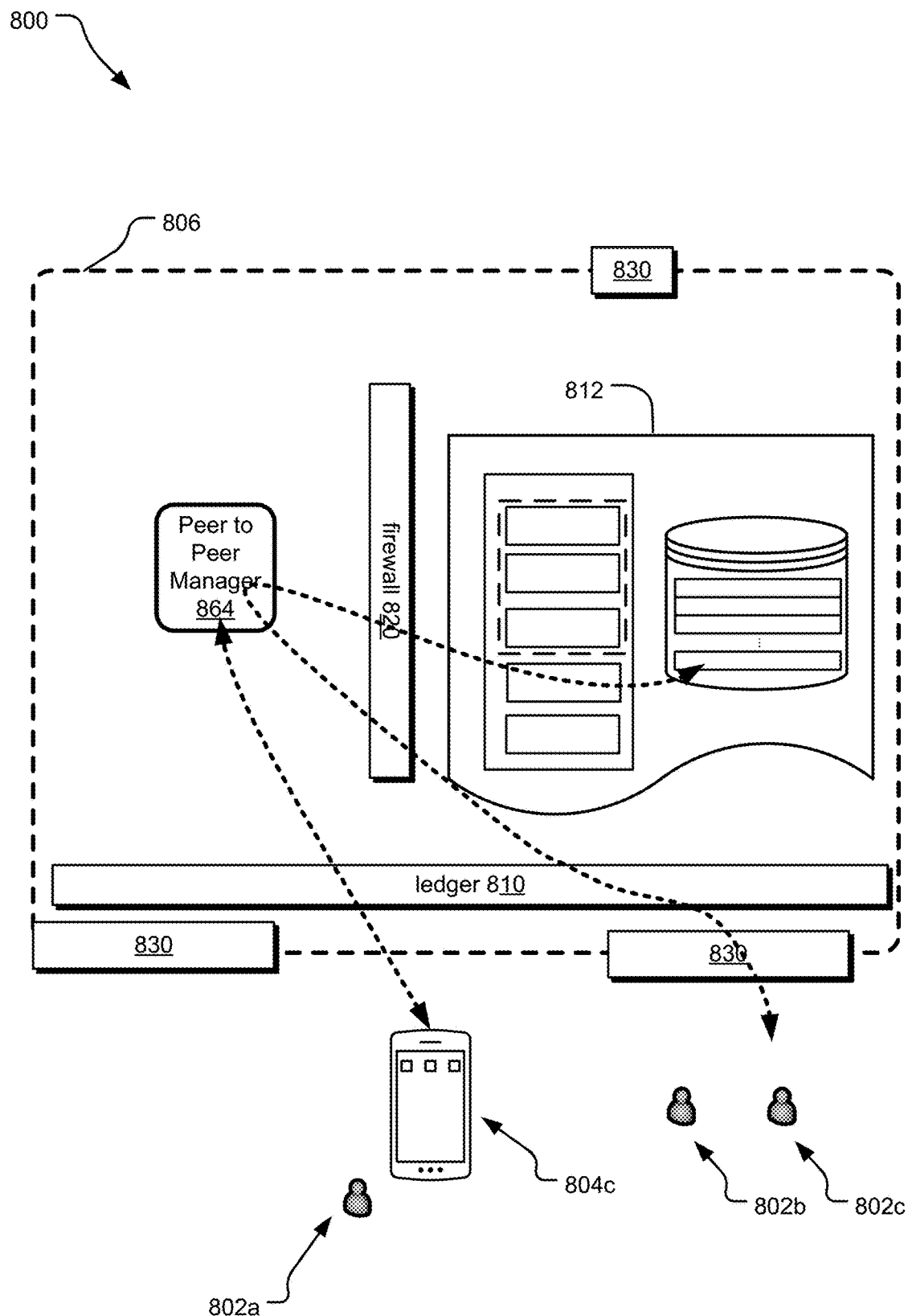
FIG. 8 illustrates an example of components of a trusted platform involved in processing a request for access to user data from a peer user.

FIG. 8 illustrates an example of a trusted platform 806 shown only with participating components in the processing of requests from peer users 802*b*, 802*c* for purposes of clarity. A user 802*a* may use a user device 804*a* to interact with a peer to peer manager 864 to establish access permission parameters for peer users 802*b*, 802*c* of the trusted platform 806. Peer users 802*b*, 802*c* may correspond to users that also have secure user profiles on the trusted platform 806. In this regard, a peer user 802*b* or 802*c* may request access to user data associated with user 802*a*. In such a case, the request may be received at the peer to peer manager 864 through a security gateway 830 that establishes secure communication between a user device of the peer user 802*b* or 802*c* and the trusted platform 806. The peer to peer manager 864 may analyze the request from the peer user 802*b* or 802*c* and retrieve access permission parameters associated with the request. Based on the determination of whether access to the requested user data behind a firewall 820 is allowed by the access permission parameters, requested user data may be shared with a peer user 802*b* or 802*c*. This sharing may include communicating the requested user data from the secure user profile 812 for the user 802*a* to a secure user profile 812 corresponding to the peer user 802*b* or 802*c* such that the data is communicated between the secure user profiles in the trusted platform 806. In this regard, the trusted platform 806 may retain control over all user data as the user data is not communicated outside the trusted platform 806. In this regard, should a user 802*a* change the access permission parameters to limit or revoke the access to the peer user 802*b* or 802*c*, such change may be effectuated to preclude further access to the requested user data that has previously been granted or for future requests for such requested user data.

Figure 9:
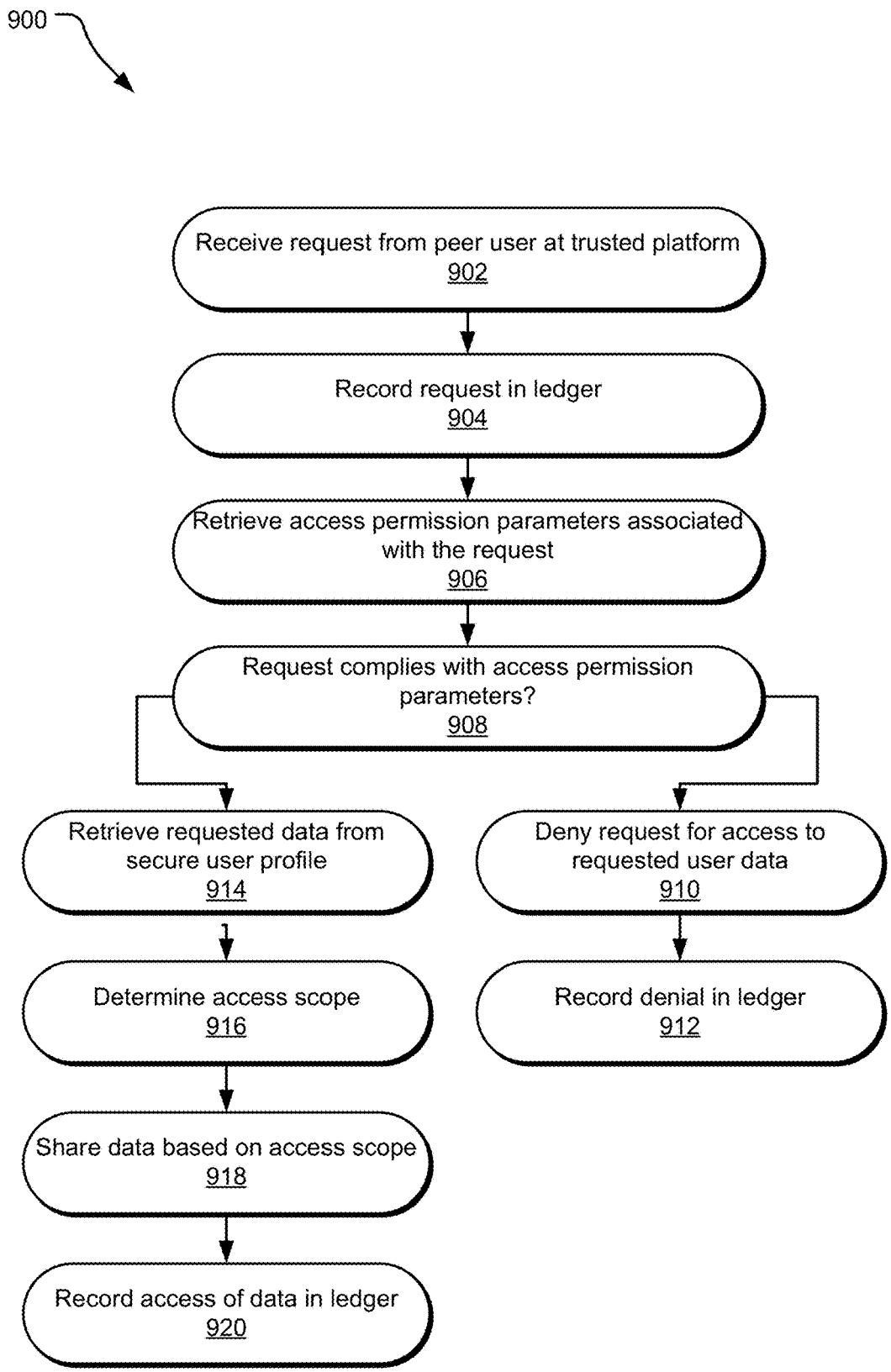
FIG. 9 illustrates example operations for processing a request for access to user data from a peer user.

With further reference to FIG. 9, example operations 900 for processing a request from a peer user are illustrated. The operations 900 include a receiving operation 902 in which a request from a peer user is received. A recording operation 904 may record the request in a ledger. A retrieving operation 906 retrieves access permission parameters for the request. A determining operation 908 determines whether the requested user data may be accessed in view of the access permission parameters. If it is determined that the requested user data cannot be accessed by the peer user, a denying operation 910 denies the request and a recording operation 912 records the denial in the ledger.

If the determination operation 908 determines that access is allowed in view of the access permission parameters, a retrieving operation 914 may access the secure storage of the secure user profile of the user. A determining operation 916 may determine the scope of access provided to the peer user. For example, a user may provide a grant of access to the peer user such that the peer user may access the requested data, but does not receive the requested user data (e.g., at the secure user profile of the peer user). In this regard, should the user elect to revoke access to the requested data, the peer user may no longer access or otherwise have possession of the requested data. However, the user may provide access permission parameters that allows sharing of the requested data with the peer user. In this case, the requested user data may be granted to the peer user. In such an instance, the peer user may be able to control the granted user data. A later revocation of the grant may preclude further access to the requested user data, but granted user data that the peer user previously obtained may not be controlled by the user. A revocation message may be provided to the peer user and documented in the ledger, but the peer user may have migrated such granted user data outside of the trusted platform, such that compliance with the revocation may not be enforced by the trusted platform. In any regard, the access of the requested user data may be recorded in a ledger in a recording operation 920.

Figure 10:
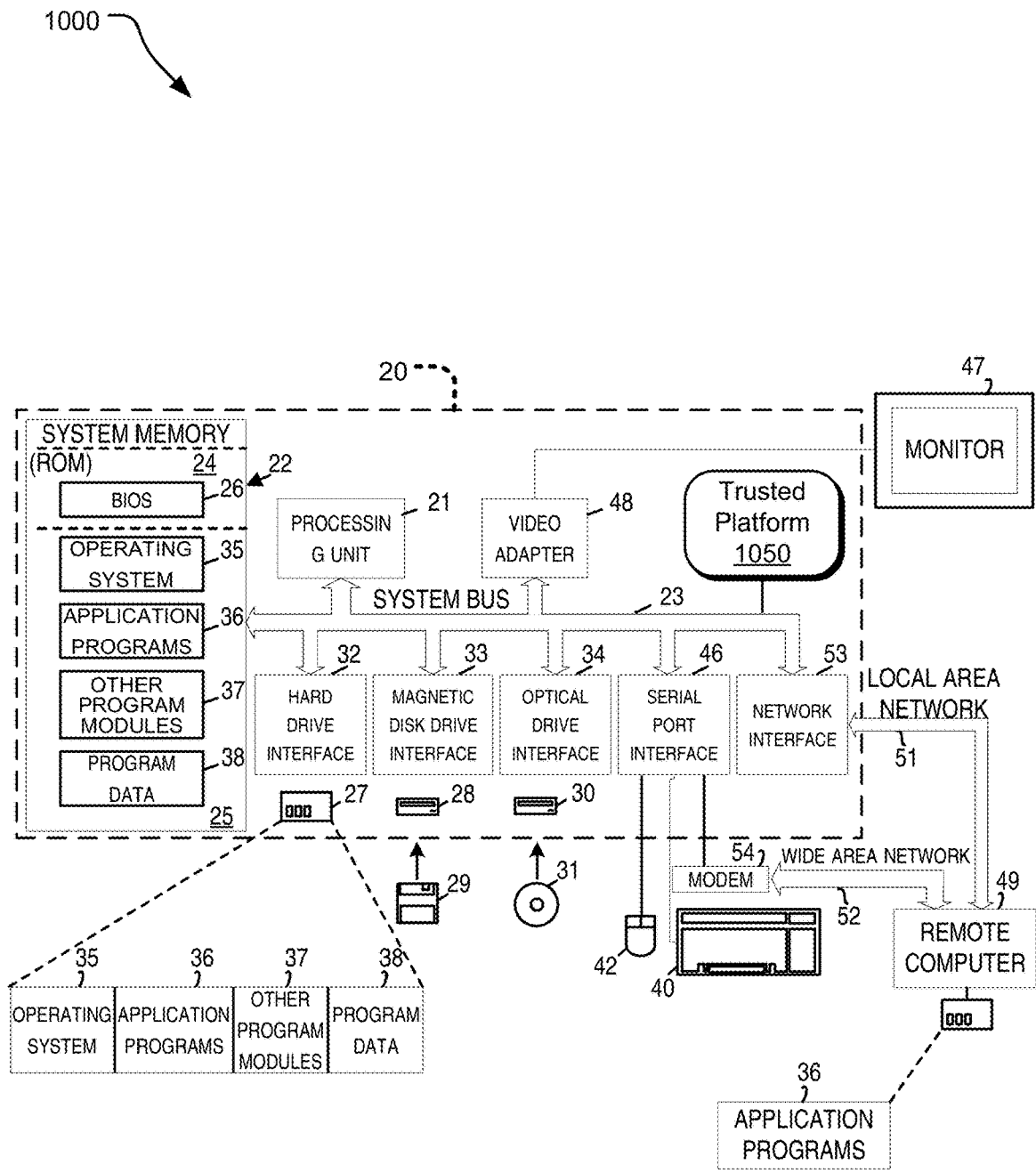
FIG. 10 illustrates an example of a processing device suited for execution of certain aspects of the present disclosure.

FIG. 10 illustrates an example 1000 that may be useful in implementing the trusted platform disclosed herein. The example hardware and operating environment of FIG. 10 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 10, for example, the computer 20 includes a processing unit 21, a system memory 22, and a system bus 23 that operatively couples various system components including the system memory to the processing unit 21. There may be only one or there may be more than one processing unit 21, such that the processor of the computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk drive 27, magnetic disk 28, optical disk 30, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus 23, but may be connected by other interfaces, such as a parallel port, game port, or a universal serial bus (USB) (not shown). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 10 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are examples and other means of communications devices for establishing a communications link between the computers may be used.

In an example implementation, software or firmware instructions for providing the trusted platform may be stored in memory 22 and/or storage devices 29 or 31 and processed by the processing unit 21. One or more datastores disclosed herein may be stored in memory 22 and/or storage devices 29 or 31 as persistent datastores. For example, a trusted platform 1050 may be implemented on the computer 20 as an application program 36 (alternatively, the trusted platform 1050 may be implemented on a server or in a cloud environment). The trusted platform 1050 may utilize one of more of the processing unit 21, the memory 22, the system bus 23, and other components of the personal computer 20.

Figure 11:
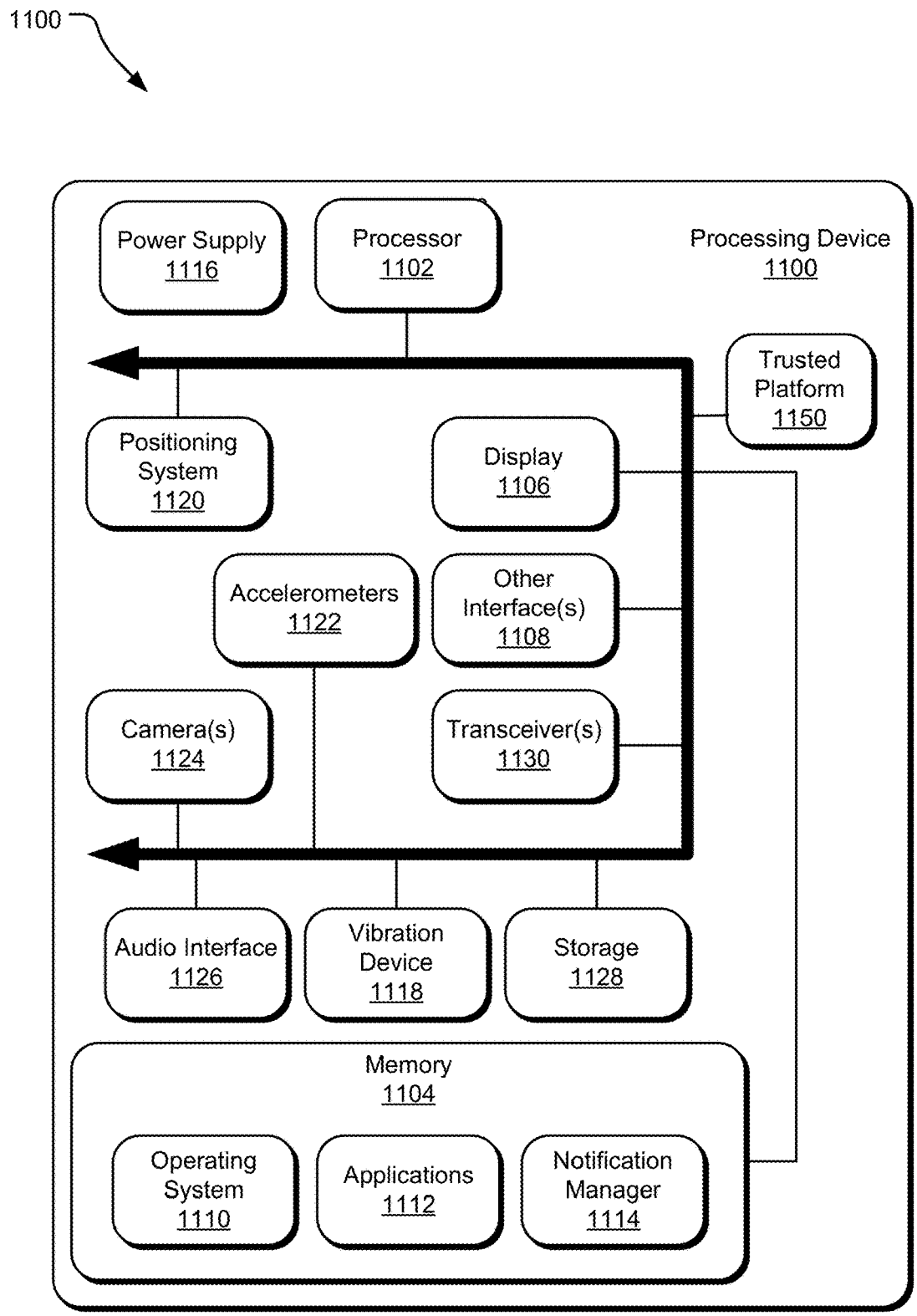
FIG. 11 illustrates an example mobile device suited for execution of certain aspects of the present disclosure.

FIG. 11 illustrates an example schematic of a processing system 1100 suitable for implementing aspects of the disclosed technology including a trusted platform 1150. The processing system 1100 includes one or more processor unit(s) 1102, memory 1104, a display 1106, and other interfaces 1108 (e.g., buttons). The memory 1104 generally includes both volatile memory (e.g., RAM) and non-volatile memory (e.g., flash memory). An operating system 1110 resides in the memory 1104 and is executed by the processor unit(s) 1102.

One or more applications 1112 are loaded in the memory 1104 and executed on the operating system 1110 by the processor unit(s) 1102. Applications 1112 may receive input from various input local devices such as a microphone, input accessory (e.g., keypad, mouse, stylus, touchpad, gamepad, racing wheel, joystick). Additionally, the applications 1112 may receive input from one or more remote devices such as remotely-located smart devices by communicating with such devices over a wired or wireless network using more communication transceivers 1130 and an antenna to provide network connectivity (e.g., a mobile phone network, Wi-Fi®, Bluetooth®). The processing device 1100 may also include various other components, such as a positioning system (e.g., a global positioning satellite transceiver) 1120, one or more accelerometers 1122, one or more cameras 1124, an audio interface 1126 (e.g., including a microphone, an audio amplifier and speaker and/or audio jack), and storage devices 1128. Other configurations may also be employed.

The processing system 1100 further includes a power supply 1116, which is powered by one or more batteries or other power sources and which provides power to other components of the processing system 1100. The power supply 1116 may also be connected to an external power source (not shown) that overrides or recharges the built-in batteries or other power sources.

In an example implementation, a trusted platform may include hardware and/or software embodied by instructions stored in the memory 1104 and/or the storage devices 1128 and processed by the processor unit(s) 1102. The memory 1104 may be the memory of a host device or of an accessory that couples to the host.

The processing system 1100 may include a variety of tangible processor-readable storage media and intangible processor-readable communication signals. Tangible processor-readable storage can be embodied by any available media that can be accessed by the processing system 1100 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing system 1100. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means an intangible communications signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

Figure 12:
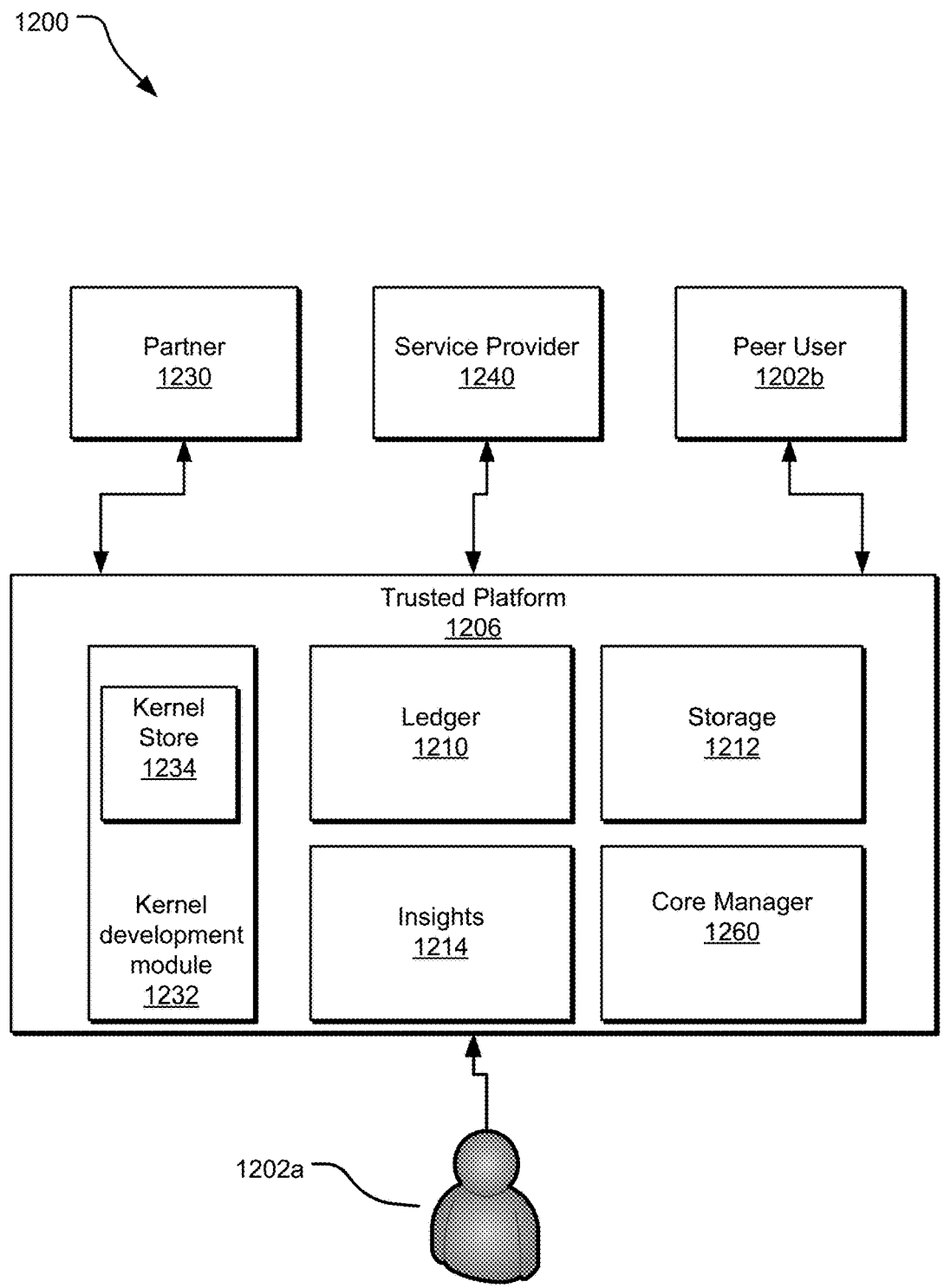
FIG. 12 illustrates another example of a secure communication system including a trusted platform.

FIG. 12 depicts another example of a secure communication environment 1200. The secure communication environment 1200 may be generally the same as that described above in relation to FIG. 1. However, the trusted platform 1206 may also include a kernel development module 1232 that includes components of the trusted 1206 platform that are used to build, certify, and make ready for deployment any application kernel. The kernel development module 1232 may include specific components of the deployment, trusted execution, and secure communications of a secure identity gateway platform designed to run on one or more computer systems as it relates to a standard development environment for the partners and service providers that are a part of the deployment, trusted execution, and secure communications of the secure identity gateway platform.

Various partners 1230 may use the kernel deployment module 1232 to generate trusted and signed application kernels that can be used to access insights 1214. In one implementation, a partner 1230 interested in deploying an application kernel may use an application development engine (discussed in further detail below in FIG. 13) of the kernel deployment module 1232 to generate and deploy such application kernels. Once the partner 1230 generates and submits various instructions that will be used to implement the application kernel, the kernel deployment module 1232 verifies the instructions to insure that the application kernel will operate in compliance with various data specifications for the user data stored in the storage 1212.

For example, such data specification for data of a particular user 1202 may specify that the certain of the user data, as specified by the user or as per the default policy of the trusted platform 1206, is never shared with any partner 1230. As an example, the user 1202 may have specified their credit card information as level A data never to be shared with a partner 1230 that is a social networking service provider or an any applications developed by such partners. In such a case, if there is any instruction submitted by a partner 1230, that is a social networking service provider, to the kernel development module 1232 accesses such credit card information, the kernel development module 1232 may remove such instruction from the application program and/or send a request to the partner to revise the application program instructions.

Once the application program instructions from the partner 1230 are verified for their compliance with the policies of the trusted platform 1206 and the user data specifications, a compiler compiles the application program instructions to generate a verified application kernel. The kernel development module 1232 runs the verified application kernel in a test environment on the trusted platform 1206 for test and certification process. The test and certification process may include testing the compliance with user protection and the developer test cases as submitted. This will either result in a pass or fail and if the code passes it will be submitted to a signed code repository for more compliance review and if it fails notification will be sent back to the developer and the code will be kept in the development environment. The process on a fail will request that the developer resubmits an update kernel with the noted failed controls addressed. This process ensures user controls of data flows and protection for the user.

Once the verified application kernel has passed the automated testing, its compliance with secure communication protocols used by the trusted platform is verified. Upon successful testing the verified application kernel is signed and it is submitted to a kernel store 1234 as signed application kernel. The signed application kernel is made available to the partner 1230 and user 1202. For example, the partner 1230 may be able to use the signed application kernel for its users. Similarly, the user 1202 may be able to deploy a client version of the application program on their mobile device and use the client version to communicate with the signed application kernel deployed in the kernel store 1234.

The deployment of the signed application kernel in the kernel store 1234 is recorded in a ledger. Furthermore, all execution of and access to the signed application kernels in the kernel store 1234 may also be tracked to verify continued compliance of the signed application kernels' with user data specifications and with trusted platform 1206's secure communication protocols.

Figure 13:
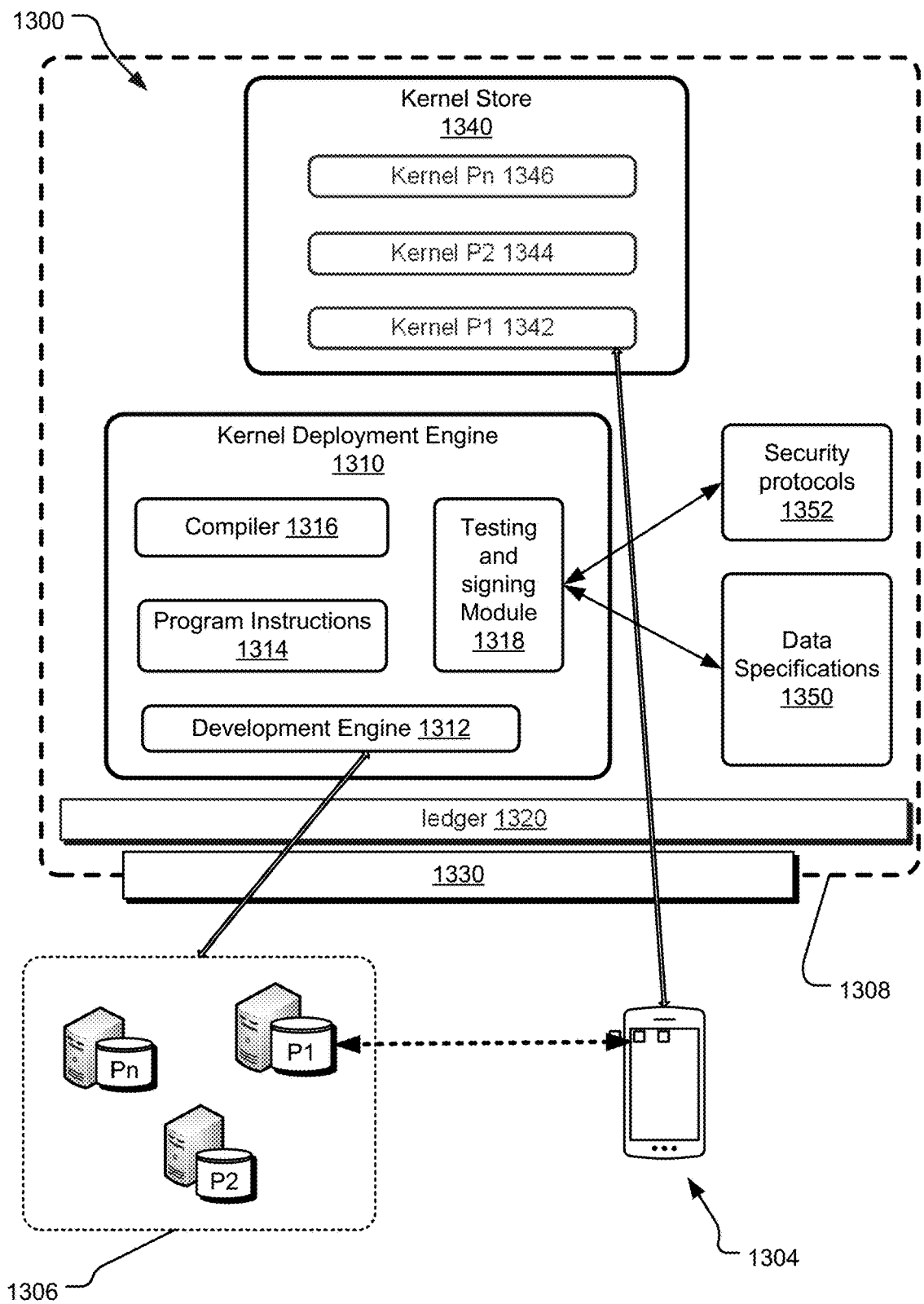
FIG. 13 illustrates an example of components of a kernel deployment engine including implemented on a trusted execution environment.

FIG. 13 illustrates an example of components of a kernel deployment engine 1310 including implemented on a trusted execution environment 1300. The kernel deployment engine 1310 may be deployed on a trusted platform 1308 that employs various security protocols to maintain and enhance security of user data, including providing a secure gateway 1330. One or more partners 1306 may use the kernel deployment engine 1310 to develop and store signed application kernels. The kernel deployment engine 1310 includes a development engine 1312 that may be used by the partners 1306 to generate application programs.

In one implementation, the development engine 1312 may provide a secure integrated development environment (IDE) that can be used by the partners 1306. The IDE may be used by the partners to enter program instructions 1314 that will be used to generate application kernels for execution on the trusted platform 1308. In one implementation, the IDE has its own coding language that is used by the partner 1306 to develop the application program instructions 1314. Alternatively, the IDE may provide an interface that allows partners to submit application program code in other coding languages, such as Java, etc., and to convert it to instructions that may be used by the kernel development engine 1310.

The kernel deployment engine 1310 may use various data specifications 1350 that specifies data usage and control specification as provided by users 1304 and the trusted platform 1308. Specifically, the data specifications may include data access specifications, data control specifications, data storage specifications, data retention specification, data aggregation specifications, and data usage specifications. Specifically, the data specifications may be provided to the trusted platform in the form of metadata for various database and data tables using the storage data. Such data specification may be exposed to the kernel development engine through a firewall. In turn, the kernel development engine 1310 may expose a copy of such data specifications to various partners 1306 developing the application kernels.

An example of a data access specification may provide that only certain partners or users can access a particular data. As an example, a user may specify that bank account number may only be accessed by a redetermined financial institution. Similarly, a data control specification may specify that a particular data may only be communicated through a secured gateway provided by the trusted platform 1308. On the other hand, a data storage specification may provide that a particular data may be stored only in the trusted platform 1308 behind a firewall. On the other hand, an example of a data aggregation specification may provide that particular data about a user may not be used in generating any non-personally identifiable information (PII). Similarly, data usage specifications may provide that particular user data may only be shared with certain other users. For example, a user may specify that purchase history data is only shared with a spouse whereas location information is shared with only immediate family members.

The kernel development engine 1310 may also include a testing and signing module 1318 that evaluates the program instructions 1314 to ensure that they are in compliance with the data specifications 1350 and the security protocols 1352. For example, if a program instruction using a particular user data is intended to communicate that particular user data to an entity outside of the trusted platform 1308 when the data specifications 1350 provide that that particular data cannot be communicated to a third party, the testing and signing module 1318 invalidates that program instruction and notifies the partner 1306 that provided such program instruction. Once all the program instructions are verified to be in compliance with the data specifications 1350 and the security control protocols 1352, the testing and signing module 1318 certifies them and makes them available to a compiler 1316.

The compiler 1316 may ingest the program instructions 1314 and generate executable application kernels that can be executable on the trusted platform 1308. In one implementation, the output of the compiler 1316 is also made available to the testing and signing module 1318 for further certification. the testing and signing module 1318 tests the compiled and executable application kernels in a test environment to ensure that they are in compliance. For example, the testing and signing module 1318 may execute the compiled and executable application kernels using test data and monitor the execution and the output to verify compliance. Once the compiled and executable application kernels are verified by the testing and signing module 1318, the testing and signing module 1318 generates a signed application kernel that is stored on a kernel store 1340. As illustrated, the kernel store 1340 includes signed application kernels 1342-1346 for various partners.

Once a signed application kernel is deployed in the kernel store 1340, the kernel store 1340 notifies the partners 1306 and the users 1304 that the signed application kernel is available for use. For example, if the signed application kernel P1 1342 is deployed on behalf of a partner 1306 P1, the partner P1 may initiate its use and notify its users to download a local client on their devices. Thus, the partner P1 may notify the user 1304 to download a local client on the user's device for communication with the signed application kernel P1 1324 on the kernel store 1340. Furthermore, once a signed application kernel is deployed on the kernel store 1340, the trusted platform 1308 may make available the secure gateway 1330 for communication between the signed application kernel and the local clients on user devices.

The kernel deployment engine 1310 may also track the usage and execution of the signed application kernels 1342-1346 and record the access activity in a ledger 1320. Furthermore, the kernel deployment engine 1310 makes periodic execution data about the signed application kernels 1340 to the testing and signing module 1318 so as to evaluate continued compliance of the signed application kernels 1342-1346 with the data specifications 1350 and security protocols 1352.

Figure 14:
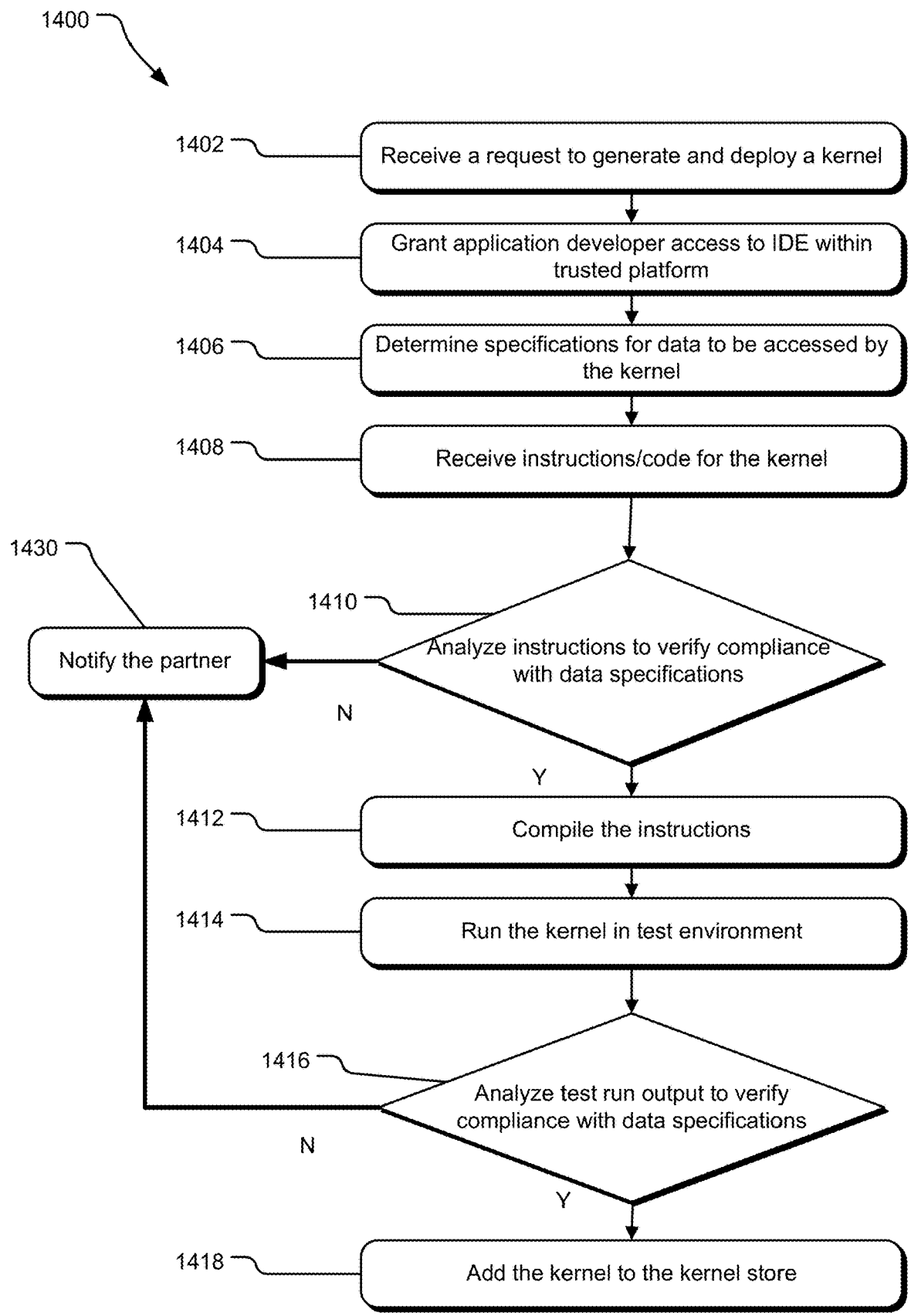
FIG. 14 illustrates an example operations for deploying a partner application on a trusted partner application deployment platform's kernel store.

FIG. 14 illustrates an example operations 1400 for deploying a partner application on a trusted partner application deployment platform's kernel store. Specifically, the operations 1400 may be implemented on the kernel deployment engine 310 disclosed above in FIG. 3. In one implementation, one or more of the operations 1400 may be stored on a computer readable medium, such as the memory 24, 25 disclosed below in FIG. 9 and be executable on a processor such as a processing unit 21 disclosed therein. An operation 1402 receives a request to generate an application kernel on a kernel store. For example, a partner providing applications for social networking may send a request to generate an application kernel for execution on a trusted platform. Upon receiving the request, an operation 1404 grants the application developer or provider access to an IDE within the kernel deployment engine 310 so that the application developer can provide or generate the application programming code.

An operation 1406 determines the specifications for the data to be accessed by the application developer generating the application kernel. Such specifications may be provided with the database or data schemas related to the user profiles. Thus, if the application provider is developing an application that is going to access personal data for travel purposes, the operation 1406 determines data specification for all data that is relevant to be and will be potentially used by the application data provider for using the personal data for travel purposes. The operation 1406 may also evaluate various data communication protocols that will be applicable to the application being developed.

An operation 1410 receives program instructions for the application kernel. Such instructions may be using a specific programming language used by an IDE of the trusted platform. Alternatively, the application provider may upload instructions I a file, such as a text file having C++ instructions that are converted, as necessary, into the language used by the IDE. Subsequently, an operation 1410 analyzes the instructions to verify their compliance with the data specifications and the communication protocols. If it is determined that the instructions are in compliance with the data specifications and the communication protocols, an operation 1412 compiles the instructions to generate executable version of the application kernel.

The compiled application kernel is run in a test environment at an operation 1414. The output generated by the test run is evaluated by an operation 1416 again to ensure the compliance of the application execution and output with the data specifications and the communication protocols. If the compliance is verified, the application kernel is added to a kernel store. If either of operations 1410 and 1416 determines that at least some of the instructions or execution output are not in compliance with the data specifications and the communication protocols, an operation 1430 notifies the application developer of the non-compliance with appropriate instructions for re-submission of the application program instructions.

Figure 15:
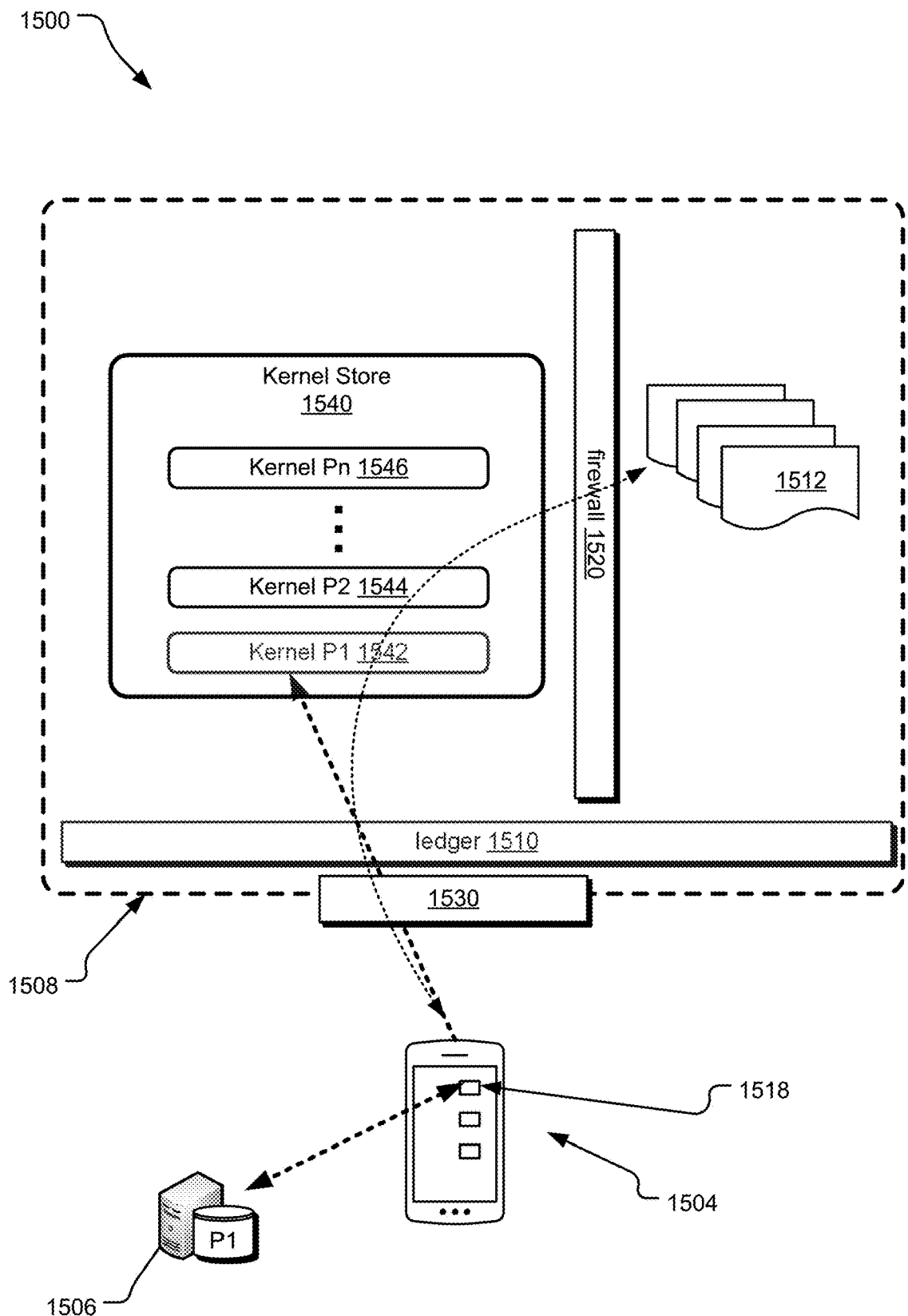
FIG. 15 illustrates example of components of a kernel store of the trusted partner application deployment platform working with user devices.

FIG. 15 illustrates example of components 1500 of a kernel store 1540 of the trusted partner application deployment platform working with user devices such as a user device 1504. Specifically, the kernel store 1540 is illustrated to include various signed applications kernels 1542-1546 that are verified to execute on a trusted platform 1508 such that they comply with all data specifications for the user data 1512 and with communication protocols of the trusted platform 1508. The trusted platform 1508 provides a security gateway 1530 for communication between each of the signed application kernels 1542-1546 and a trusted partner client application 1518 running on the client device 1506. Various implementations of security gateway 1530 may be according to any of the foregoing discussion above in relation to FIGS. 2-9.

In one implementation, a partner 1506 that generated the signed application kernel communicating with the client device 1504 may facilitate implementation of the client device 1504's access to the signed application kernel via the secure gateway 1530.

The trusted platform 1508 also monitors the communication between the signed application kernels 1542-1546 and the client device 1504 in a ledger 1510 that may be evaluated to ensure the continued compliance of the signed application kernels' execution. The trusted platform 1508 also allows the client device 1504 to access user profiles 1512 using the appropriate signed application kernel through an internal firewall 1520.

Figure 16:
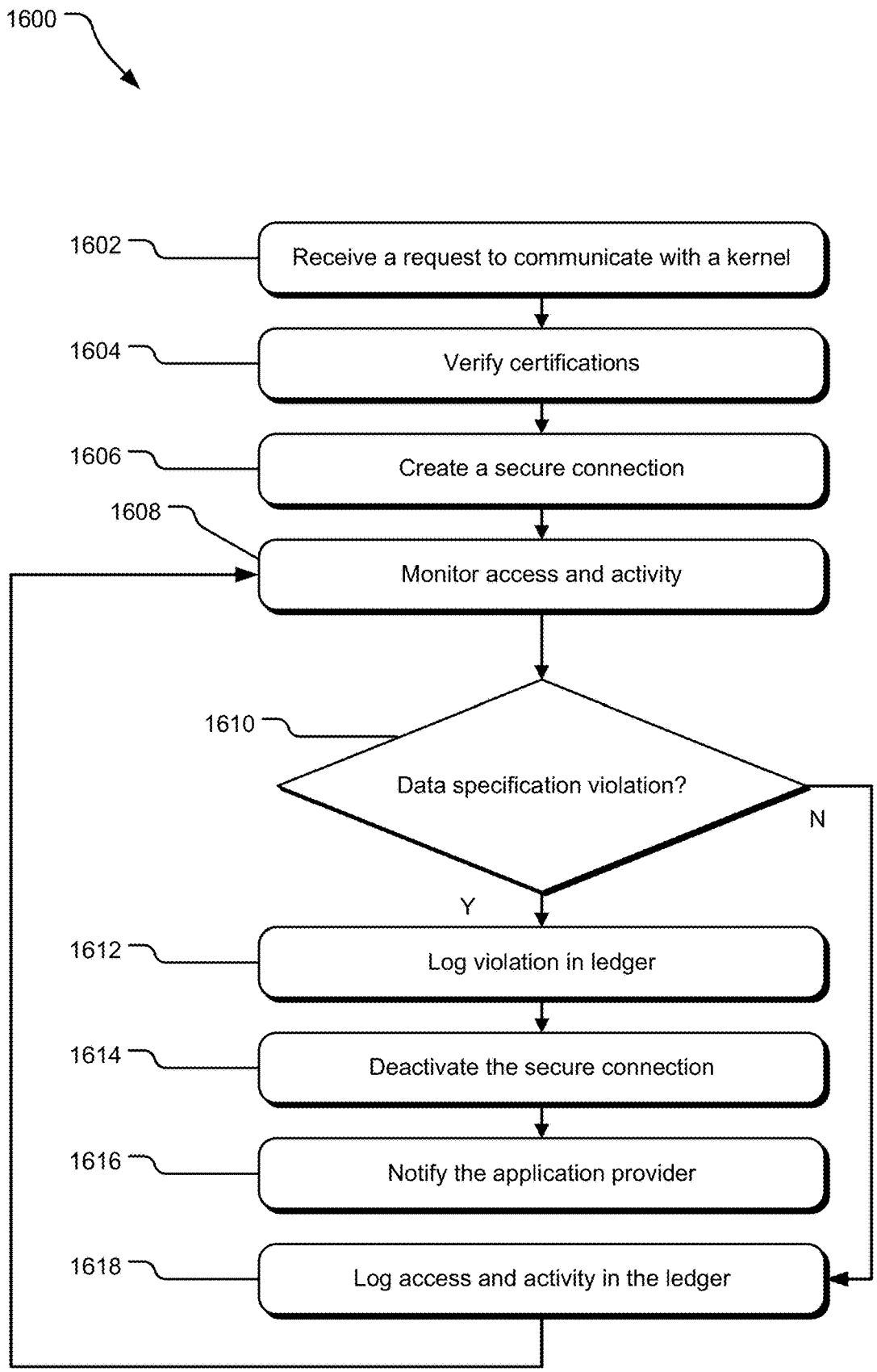
FIG. 16 illustrates example operations for monitoring execution of trusted application kernels and user devices.

FIG. 16 illustrates example operations 1600 for monitoring execution of trusted application kernels and user devices. An operation 1602 receives a request from a client device for communicating with a signed application kernel. In response, an operation 1604 verifies certifications of the signed application kernel an upon successful verification, an operation 1606 creates a secure connection between the client device and the signed application kernel via a security gateway of the trusted platform hosting the signed application kernel.

As the client device communicates with the signed application kernel, an operation 1608 monitors the access and activity of the signed application kernel. The output of the operation 1608 is input to a determining operation 1610 to determine if there has been any violation of data specifications or communication policies of the trusted platform. In response to any violation, an operation 1612 logs the violation in the ledger and an operation 1614 terminates the access of the client device with the signed application kernel. Subsequently, an operation 1616 notifies the application developer of the violation with instructions for revisions thereto. If there is no violation, an operation 1618 logs the access and activity of the signed application kernel into a ledger and continues with further monitoring of the signed application kernel activity.

Figure 17:
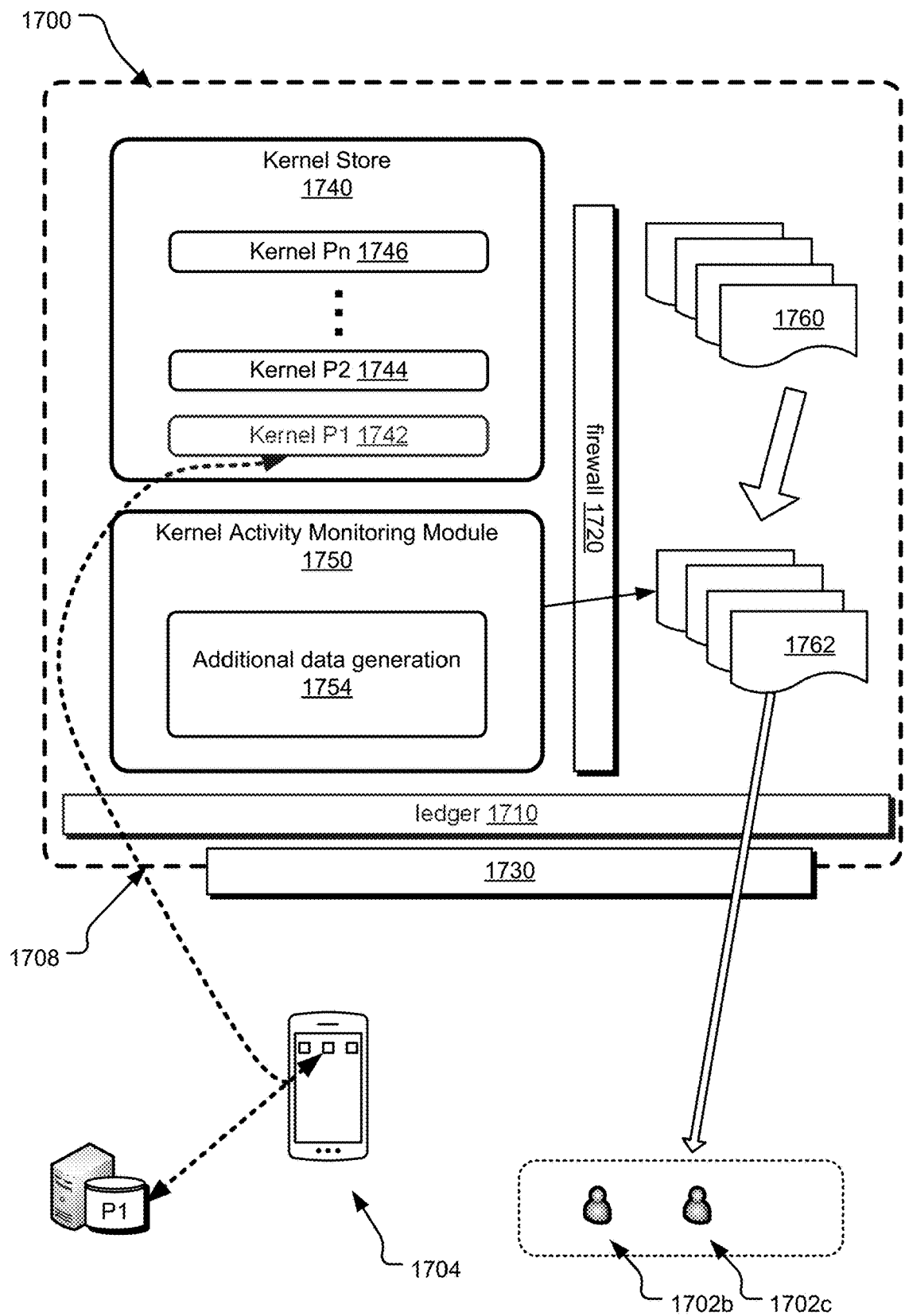
FIG. 17 illustrates example components of a kernel store of the trusted partner application deployment platform working with user profiles and insights.

FIG. 17 illustrates example components 1700 of a kernel store 1740 of a trusted partner application deployment platform working with user profiles and insights. Specifically, the kernel store 1740 may store various signed application kernels 1742-1746 that are generated and certified using a kernel deployment engine such as the kernel deployment engine 310 disclosed in FIG. 3. The activities of the signed application kernels 1742-1746 may be monitored by a kernel activity monitoring module 1750. In one implementation, kernel activity monitoring module 1750 monitors the activities of signed application kernels 1742-1746 for both continued compliance with various user data specifications and for generating additional data based on the activity.

For example, an additional data generation module 1754 analyzes the collected data, such as the number of accesses to the signed application kernels 1742-1746, the amount of data communicated between a client device 1704 and the signed application kernels 1742-1746, the type of data communicated between a client device 1704 and the signed application kernels 1742-1746, etc., and generates additional and/or aggregate data based on collected data. An example of an additional data may be how often a user has dined at a seafood restaurant in a given time period.

The newly generated additional data 1762 may be stored at additions to user profiles 1760 about various users. Subsequently, based on the user data specifications related to the user profiles 1760, the additional data 1762 may be stored with other users 1702. For example, of the user profile specifies that any additional data may be shared with friends, family, etc. IN the case of additional data related to frequency of dining at a seafood restaurant, sharing such newly generated data with the family and friends allows them to better understand the tastes of the user. All communications between the other users 1702 is made using secured gateway 1730 and is recorded in a ledger 1710.

Figure 18:
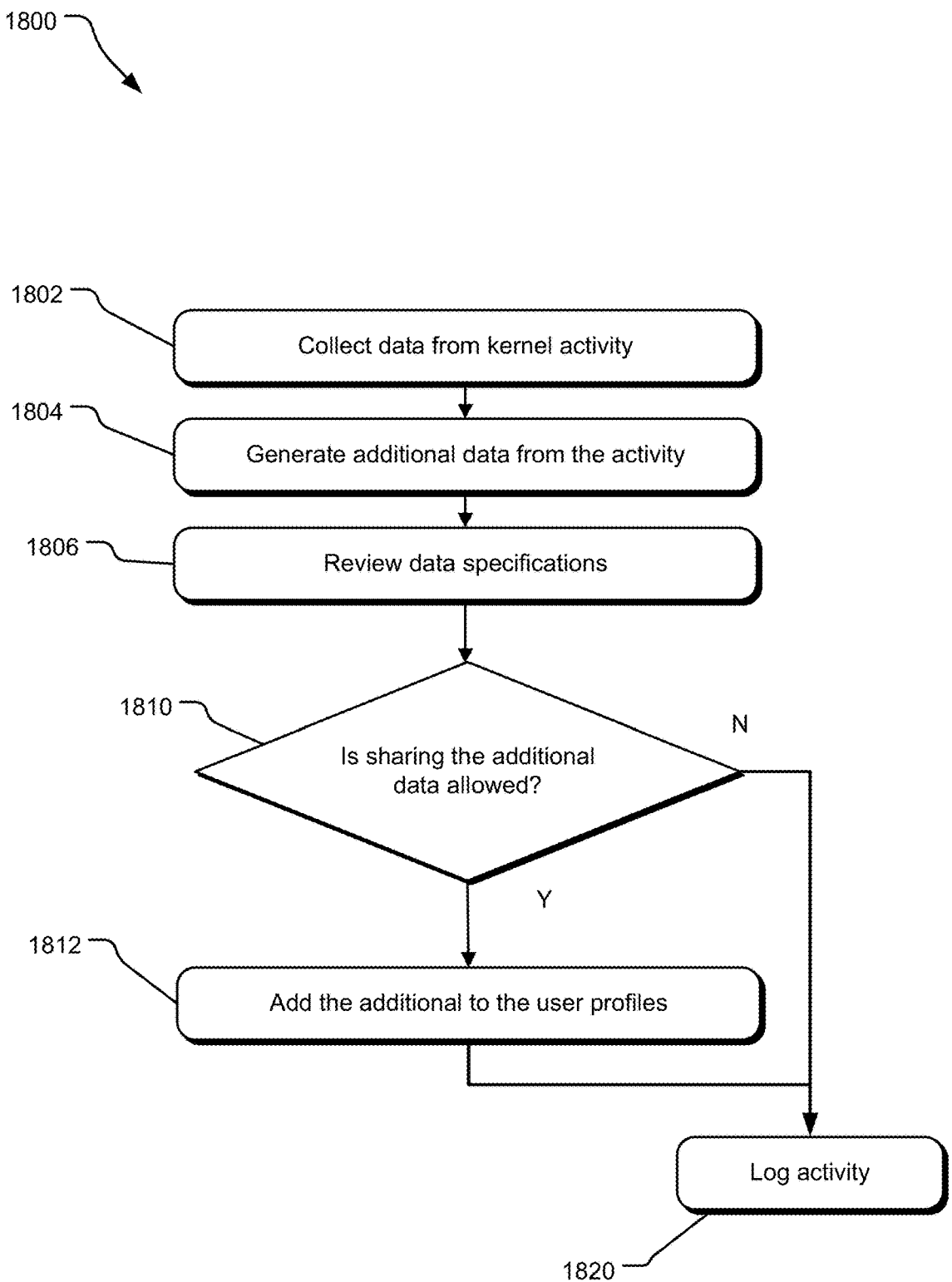
FIG. 18 illustrates operations for collecting data from execution of trusted application kernels.

FIG. 18 illustrates operations 1800 for collecting data from execution of trusted application kernels. An operation 1802 collects various data from activity of signed application kernels. For example, if a signed application kernel for a dining application has certain interactions with a user device, various data about the activity is collected. An operation 1804 generates additional data from the data collected regarding various users at operation 1802. An operation 1806 reviews the data specifications regarding the various data collected and generated at operations 1802 and 1804.

For example, if any location data of the users is collected, the operation 1806$n$ reviews the data specifications related to use of direct or generated location data for the user. Using the data specifications, an operation 1810 determines if sharing of any collected or generated data is allowed. If so, an operation 1812 adds the newly generated data to the user profiles. Subsequently, an operation 1820 logs all the activity related to generation and sharing of the data.

One example of the present disclosure includes a method of managing requests for access to user data. The method includes receiving, at a trusted platform, a request for access to user data stored in a secure user profile in a secure storage location accessible only by the trusted platform. The request identifies at least requested user data, a user identity for the requested user data, and a requesting entity. The method also includes accessing user defined access permission parameters applicable to the request and comparing the request to the access permission parameters. The method also includes determining whether access to the requested user data of the request is authorized by a user of the secure user profile based on the comparison of the request to the access permission parameters.

In another example, the request is received from a signed program of the trusted platform. The signed program may execute in a trusted execution environment (TEE) of the trusted platform corresponding to the secure user profile. In turn, if the determining operation grants access to the request, the method includes executing the signed program in the TEE using the requested user data.

In another example, the request is received at the trusted platform from an external entity to the trusted platform through a security gateway of the trusted platform. The method may also include communicating the requested user data to the external entity through the security gateway if the determining operation grants access to the request. The communicating may include a limitation on use of the requested data by the external entity to a declared use contained in the request. In an example, the request is received at a peer to peer share program of the trusted platform from another secure user profile of the trusted platform.

In an example, the method includes associating the request with at least one metadata tag based on at least one of the user data, the requested user data, the user identity, or the requesting entity. The access permission parameters may correspond with the at least one metadata tag for data authorization instructions to the user data based on the metadata tag. The at least one metadata tag may correspond to a security layer in a multi-layered data structure. Each security layer in the multi-layered data structure has an assigned asset permission parameters by the user that define access permissions to the user data assigned to the respective security layer.

In another example, the method includes recording the request and the determination of whether to grant access to the requested user data in a ledger of the trusted platform. If access to the requested user data is authorized, the method includes recording the user data accessed from the secure user profile in the ledger in association with the request.

In another example, the trusted platform includes a plurality of secure user profiles. Each of the plurality of secure user profiles may reside in a unique secure environment uniquely controlled by the user of the secure user profile.

Another example of the present disclosure includes a trusted platform for control of user data. The trusted platform includes a secure user profile comprising user data that is stored in a secure storage location of the trusted platform. The trusted platform also includes a program store comprising programs that are executable in the trusted platform and that have been tested and signed by the trusted platform. The platform also includes a trusted execution environment (TEE) in which one or more programs from the program store may execute to request access to the user data stored in the secure user profile by issuing a request that at least identifies requested user data, a user identity for the requested user data, and a requesting entity. The TEE is operative to compare the request to access permission parameters for the secure user profile applicable to the request to determine whether to grant the request from the one or more programs.

In an example, at least one of the one or more programs comprise a signed partner program of a partner entity external to the trusted platform. The signed partner program executes in the TEE to access the requested user data in the secure user profile if the determining operation grants access to the request of the signed partner program.

In another example, at least one of the one or more programs is an access control program that receives the request from an external entity through a security gateway of the trusted platform. The access control program operative to communicate the requested user data to the external entity through the security gateway if the determining operation grants access to the request. The access control program may communicate a limitation on use of the requested data by the external entity to a declared use contained in the request.

In another example, at least one of the one or more programs is a peer to peer share program that receives the request from another secure user profile of the trusted platform.

In an example, the request of the one or more programs is associated with at least one metadata tag based on at least one of the user data, the requested user data, the user identity, or the requesting entity. The access permission parameters may correspond with the at least one metadata tag for data authorization instructions to the user data based on the metadata tag. The secure user profile may include a plurality of security layers in a multi-layered data structure. Each security layer in the multi-layered data structure may have assigned asset permission parameters by the user that define access permissions to the user data assigned to the respective security layer. The at least one metadata tag corresponds to a security layer in the multi-layered data structure.

In an example, the trusted platform includes a ledger in which the request and the determination of whether to grant access to the requested user data are recorded. The user data accessed from the secure user profile may be recorded in the ledger if access to the requested user data is authorized.

In another example, the trusted platform also includes a plurality of TEEs each corresponding to a unique secure user profile and controlled by the user of the secure user profile.

Another example of the present disclosure includes one or more tangible processor-readable storage media embodied with instructions for executing, on one or more processors and circuits of a device, a process of managing requests for access to user data. The process includes receiving, at a trusted platform, a request for access to user data stored in a secure user profile in a secure storage location accessible only by the trusted platform. The request identifies at least requested user data, a user identity for the requested user data, and a requesting entity. The process further includes accessing user defined access permission parameters applicable to the request and comparing the request to the access permission parameters. The process includes determining whether access to the requested user data of the request is authorized by a user of the secure user profile based on the comparison of the request to the access permission parameters.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method of managing requests for access to user data, the method comprising:
  receiving, at a trusted platform, a request for access to user data stored in a secure user profile in a secure storage location accessible only by the trusted platform, the request identifying at least requested user data, a user identity for the requested user data, and a requesting entity;
  associating the request with at least one metadata tag based on at least one of the user data, the requested user data, the user identity, or the requesting entity;
  accessing user defined access permission parameters applicable to the request;
  comparing the request to the access permission parameters;
  determining whether access to the requested user data of the request is authorized by a user of the secure user profile based on the comparison of the request to the access permission parameters, wherein the access permission parameters correspond with the at least one metadata tag for data authorization instructions to the user data based on the metadata tag, and wherein the at least one metadata tag corresponds to a security layer in a multi-layered data structure, each security layer in the multi-layered data structure having assigned asset permission parameters by the user that define access permissions to the user data assigned to the respective security layer; and
  recording the request and the determination of whether to grant access to the requested user data in a ledger of the trusted platform, wherein if access to the requested user data is authorized, recording the user data accessed from the secure user profile in the ledger in association with the request.

2. The method of claim 1, wherein the request is received from a signed program of the trusted platform, the signed program executing in a trusted execution environment (TEE) of the trusted platform corresponding to the secure user profile, and if the determining operation grants access to the request, executing the signed program in the TEE using the requested user data.

3. The method of claim 1, wherein the request is received at the trusted platform from an external entity to the trusted platform through a security gateway of the trusted platform; and
  communicating the requested user data to the external entity through the security gateway if the determining operation grants access to the request.

4. The method of claim 3, wherein the communicating comprises a limitation on use of the requested data by the external entity to a declared use contained in the request.

5. The method of claim 1, wherein the request is received at a peer to peer share program of the trusted platform from another secure user profile of the trusted platform.

6. The method of claim 1, wherein the trusted platform comprises a plurality of secure user profiles, each of the plurality of secure user profiles residing in a unique secure environment uniquely controlled by the user of the secure user profile.

7. A trusted platform for control of user data, comprising:
  a secure user profile comprising user data that is stored in a secure storage location of the trusted platform;
  a program store comprising memory for storing programs that are executable in the trusted platform and that have been tested and signed by the trusted platform; and
  a trusted execution environment (TEE) comprising a hardware processor in which one or more programs from the program store may execute to request access to the user data stored in the secure user profile by issuing a request that at least identifies requested user data, a user identity for the requested user data, and a requesting entity, the TEE operative to associate the request with at least one metadata tag based on at least one of the user data, the requested user data, the user identity, or the requesting entity and compare the request to access permission parameters for the secure user profile applicable to the request to determine whether to grant the request from the one or more programs, wherein the access permission parameters correspond with the at least one metadata tag for data authorization instructions to the user data based on the metadata tag, and wherein the at least one metadata tag corresponds to a security layer in a multi-layered data structure, each security layer in the multi-layered data structure having assigned asset permission parameters by the user that define access permissions to the user data assigned to the respective security layer;
  a ledger in which the request and the determination of whether to grant access to the requested user data are recorded, wherein the user data accessed from the secure user profile is recorded in the ledger if access to the requested user data is authorized.

8. The trusted platform of claim 7, wherein at least one of the one or more programs comprise a signed partner program of a partner entity external to the trusted platform, the signed partner program executing in the TEE to access the requested user data in the secure user profile if the determining operation grants access to the request of the signed partner program.

9. The trusted platform of claim 7, wherein at least one of the one or more programs is an access control program that receives the request from an external entity through a security gateway of the trusted platform, the access control program operative to communicate the requested user data to the external entity through the security gateway if the determining operation grants access to the request.

10. The trusted platform of claim 9, wherein the access control program communicates a limitation on use of the requested data by the external entity to a declared use contained in the request.

11. The trusted platform of claim 7, wherein at least one of the one or more programs is a peer to peer share program that receives the request from another secure user profile of the trusted platform.

12. The trusted platform of claim 7, further comprising:
a plurality of TEEs each corresponding to a unique secure user profile and controlled by the user of the secure user profile.

13. One or more non-transitory computer-readable storage media embodied with instructions for executing, on one or more processors and circuits of a device, a process of managing requests for access to user data, comprising:
receiving, at a trusted platform, a request for access to user data stored in a secure user profile in a secure storage location accessible only by the trusted platform, the request identifying at least requested user data, a user identity for the requested user data, and a requesting entity;
associating the request with at least one metadata tag based on at least one of the user data, the requested user data, the user identity, or the requesting entity;
accessing user defined access permission parameters applicable to the request;
comparing the request to the access permission parameters;
determining whether access to the requested user data of the request is authorized by a user of the secure user profile based on the comparison of the request to the access permission parameters, wherein the access permission parameters correspond with the at least one metadata tag for data authorization instructions to the user data based on the metadata tag, and wherein the at least one metadata tag corresponds to a security layer in a multi-layered data structure, each security layer in the multi-layered data structure having assigned asset permission parameters by the user that define access permissions to the user data assigned to the respective security layer; and
recording the request and the determination of whether to grant access to the requested user data in a ledger of the trusted platform, wherein if access to the requested user data is authorized, recording the user data accessed from the secure user profile in the ledger in association with the request.

* * * * *